(12) United States Patent
Pellizzari et al.

(10) Patent No.: US 7,249,596 B2
(45) Date of Patent: *Jul. 31, 2007

(54) FUEL SYSTEM FOR AN INTERNAL COMBUSTION ENGINE AND METHOD FOR CONTROLLING SAME

(75) Inventors: Roberto O. Pellizzari, Groton, MA (US); John Baron, Lexington, MA (US); Jan-Roger Linna, Boston, MA (US); Peter Loftus, Cambridge, MA (US); Peter Palmer, Carson City, NV (US); John Paul Mello, Belmont, MA (US); Stuart Bennett Sprague, Berkeley, CA (US)

(73) Assignee: Philip Morris USA Inc., Richmond, VA (US)

( * ) Notice: Subject to any disclaimer, the term of this patent is extended or adjusted under 35 U.S.C. 154(b) by 71 days.

This patent is subject to a terminal disclaimer.

(21) Appl. No.: 11/137,910

(22) Filed: May 26, 2005

(65) Prior Publication Data

US 2005/0211229 A1 Sep. 29, 2005

Related U.S. Application Data

(63) Continuation of application No. 10/284,180, filed on Oct. 31, 2002, now Pat. No. 6,913,004, which is a continuation-in-part of application No. 10/143,250, filed on May 10, 2002, now Pat. No. 6,779,513.

(51) Int. Cl.
*F02B 3/00* (2006.01)
(52) U.S. Cl. ..................... 123/549; 123/557
(58) Field of Classification Search ........ 123/432–557; 239/135–139; 219/206–207
See application file for complete search history.

(56) References Cited

U.S. PATENT DOCUMENTS 3,716,416 A 2/1973 Adlhart et al. ................ 429/23

(Continued)

FOREIGN PATENT DOCUMENTS

DE 482591 2/1930

(Continued)

OTHER PUBLICATIONS

"Linear 02 Sensor" Bosch Automotive Handbook, vol. 5, 2000, pp. 117-118, XP002286592.

(Continued)

*Primary Examiner*—Marguerite McMahon
(74) *Attorney, Agent, or Firm*—Roberts, Mlotkowski & Hobbes

(57) ABSTRACT

A fuel system for use in an internal combustion engine includes a plurality of fuel injectors, each injector including at least one capillary flow passage, the at least one capillary flow passage having an inlet end and an outlet end, a heat source arranged along the at least one capillary flow passage, the heat source operable to heat a liquid fuel in the at least one capillary flow passage to a level sufficient to convert at least a portion thereof from the liquid state to a vapor state, and a valve for metering fuel to the internal combustion engine, a controller to control the power supplied to the heat source of each of the plurality of fuel injectors to achieve a predetermined target temperature, a sensor for use in determining engine air flow and a sensor for measuring a value indicative of degree of engine warm-up of the internal combustion engine.

39 Claims, 15 Drawing Sheets

U.S. PATENT DOCUMENTS

| | | | |
|---|---|---|---|
| 3,868,939 A | 3/1975 | Friese et al. ............ | 123/179.15 |
| 3,933,135 A | 1/1976 | Zillman et al. | |
| 3,999,525 A | 12/1976 | Stumpp et al. ............. | 123/557 |
| 4,210,103 A | 7/1980 | Dimitroff et al. ........... | 123/1 A |
| 4,223,652 A | 9/1980 | Budnicki .................... | 123/676 |
| 4,325,341 A | 4/1982 | Yamauchi et al. .......... | 123/472 |
| 4,344,402 A | 8/1982 | Child et al. ................. | 123/538 |
| 4,345,569 A | 8/1982 | Hattori et al. .............. | 123/549 |
| 4,403,576 A | 9/1983 | Dimitroff et al. ............. | 123/3 |
| 4,458,655 A | 7/1984 | Oza .......................... | 123/558 |
| 4,870,932 A | 10/1989 | Asmus .................. | 123/179.21 |
| 4,886,032 A | 12/1989 | Asmus ........................ | 123/557 |
| 4,955,351 A | 9/1990 | Lewis et al. ................ | 123/557 |
| 5,195,477 A | 3/1993 | Hudson, Jr. et al. ..... | 123/179.7 |
| 5,226,400 A | 7/1993 | Birch ......................... | 123/557 |
| 5,320,519 A | 6/1994 | Bang et al. .................. | 431/11 |
| 5,331,937 A | 7/1994 | Clarke ........................ | 123/491 |
| 5,332,046 A | 7/1994 | Tanimizu et al. | |
| 5,343,848 A | 9/1994 | Birch et al. ................. | 123/557 |
| 5,482,023 A | 1/1996 | Hunt et al. ................. | 123/491 |
| 5,524,582 A | 6/1996 | Suh et al. ................. | 123/179.8 |
| 5,529,035 A | 6/1996 | Hunt et al. ............ | 123/179.15 |
| 5,758,826 A | 6/1998 | Nines | |
| 5,813,388 A | 9/1998 | Cikanek, Jr. et al. ........ | 123/549 |
| 5,836,289 A | 11/1998 | Thring ........................ | 123/549 |
| 5,850,822 A | 12/1998 | Romann et al. ............ | 123/549 |
| 5,894,832 A | 4/1999 | Nogi et al. ................. | 123/491 |
| 5,947,091 A | 9/1999 | Krohn et al. ................ | 123/549 |
| 6,067,970 A | 5/2000 | Awarzamani et al. ........ | 123/549 |
| 6,067,971 A | 5/2000 | Cikanek, Jr. et al. ........ | 123/549 |
| 6,102,303 A | 8/2000 | Bright et al. | |
| 6,109,247 A | 8/2000 | Hunt ........................... | 123/549 |
| 6,189,518 B1 | 2/2001 | Cooke ........................ | 123/549 |
| 6,189,803 B1 | 2/2001 | Ganan-Calvo | |
| 6,234,153 B1 | 5/2001 | DeGroot et al. ............. | 123/525 |
| 6,237,576 B1 | 5/2001 | Buccino et al. ............. | 123/549 |
| 6,276,347 B1 | 8/2001 | Hunt .......................... | 123/549 |
| 6,332,457 B1 | 12/2001 | Imoehl ....................... | 123/549 |
| 6,354,256 B1 | 3/2002 | Ohanian et al. ........ | 123/179.21 |
| 6,390,076 B2 | 5/2002 | Hunt .......................... | 123/549 |
| 6,557,521 B2 | 5/2003 | Ichihara et al. ............. | 123/299 |
| 6,662,780 B2 | 12/2003 | Yook .......................... | 123/336 |
| 6,779,513 B2 | 8/2004 | Pellizzari et al. ........... | 123/549 |
| 6,913,004 B2 * | 7/2005 | Pellizzari et al. ........... | 123/549 |
| 6,913,005 B2 * | 7/2005 | Linna et al. ................. | 123/549 |
| 2001/0020469 A1 | 9/2001 | Hunt .......................... | 123/549 |
| 2003/0178009 A1 | 9/2003 | Baron et al. ................. | 123/549 |
| 2003/0178010 A1 | 9/2003 | Baron et al. ................. | 123/549 |
| 2003/0178011 A1 | 9/2003 | Baron et al. ................. | 123/549 |

FOREIGN PATENT DOCUMENTS

| | | |
|---|---|---|
| DE | 19546851 | 6/1997 |
| DE | 199 52 344 | 5/2001 |
| EP | 0 485 610 | 5/1992 |
| EP | 0915248 | 5/1999 |
| JP | 5-141329 | 6/1993 |
| WO | WO 87/00887 | 2/1987 |
| WO | WO 00/19087 | 4/2000 |
| WO | WO 2004/042217 | 5/2004 |

OTHER PUBLICATIONS

Patent Abstracts of Japan vol. 0175, No. 30 (M-1485), Sep. 24, 1993.

* cited by examiner

FUEL SYSTEM FOR AN INTERNAL COMBUSTION ENGINE AND METHOD FOR CONTROLLING SAME

RELATED APPLICATION

This patent application is a continuation of application Ser. No. 10/284,180, filed on Oct. 31, 2002, now U.S. Pat. No. 6,913,004, which is a continuation-in-part of application Ser. No. 10/143,250, filed on May 10, 2002, now U.S. Pat. No. 6,779,513, directed to a Fuel Injector for an Internal Combustion Engine, each of which is hereby incorporated by reference in their entirety.

FIELD

The present invention relates to fuel delivery in an internal combustion engine.

BACKGROUND

In light of the evermore stringent emissions regulations that are planned to take effect over the next few years, including California Low Emission Vehicle II (LEV II), Federal USA EPA Tier 2, and European Union EU-IV, pre-catalyst engine-out HC emissions, especially during cold start and warm-up, are attracting significant efforts in research and development. This is due in large part to the fact that as much as 80 percent of the total hydrocarbon emissions produced by a typical, modern light-duty vehicle during the Federal Test Procedure (FTP) can occur during the first 120 seconds of the test.

These high levels of emissions are largely attributable to cold engine and exhaust component temperatures. Specifically, cold engine components necessitate fuel-rich operation, in which the excess fuel is used to compensate for the portion of fuel that has attached to the walls of the intake system and combustion chamber and, thus, is not readily combusted. In addition, a cold three-way catalyst cannot reduce a significant amount of the unburned hydrocarbons that pass through the engine during cold-start. As a result, high concentrations of unburned hydrocarbons are emitted from the tailpipe. It is understood that the over-fueling associated with excessive hydrocarbon emissions during cold-start could be eliminated through the use of gasoline vapor rather than liquid gasoline.

A variety of systems have been devised to supply fine liquid fuel droplets and air to internal combustion engines that work relatively well after engine warm-up. These systems either supply fuel directly into the combustion chamber (direct injection) or utilize a carburetor or fuel injector(s) to supply the mixture through an intake manifold into a combustion chamber (indirect injection). In currently employed systems, the fuel-air mixture is produced by atomizing a liquid fuel and supplying it as fine droplets into an air stream.

In conventional spark-ignited engines employing port-fuel injection, the injected fuel is vaporized by directing the liquid fuel droplets at hot components in the intake port or manifold. Under normal operating conditions, the liquid fuel films on the surfaces of the hot components and is subsequently vaporized. The mixture of vaporized fuel and intake air is then drawn into the cylinder by the pressure differential created as the intake valve opens and the piston moves towards bottom dead center. To ensure a degree of control that is compatible with modern engines, this vaporizing technique is typically optimized to occur in less than one engine cycle.

Under most engine operating conditions, the temperature of the intake components is sufficient to rapidly vaporize the impinging liquid fuel droplets. However, as indicated, under conditions such as cold-start and warm-up, the fuel is not vaporized through impingement on the relatively cold engine components. Instead, engine operation under these conditions is ensured by supplying excess fuel such that a sufficient fraction evaporates through heat and mass transfer as it travels through the air prior to impinging on a cold intake component. Evaporation rate through this mechanism is a function of fuel properties, temperature, pressure, relative droplet and air velocities and droplet diameter. Of course, this approach breaks down in extreme ambient cold-starts, in which the fuel volatility is insufficient to produce vapor in ignitable concentrations with air.

In order for combustion to be chemically complete, the fuel-air mixture must be vaporized to a stoichiometric or fuel-lean gas-phase mixture. A stoichiometric combustible mixture contains the exact quantities of air (oxygen) and fuel required for complete combustion. For gasoline, this air-fuel ratio is about 14.7:1 by weight. A fuel-air mixture that is not completely vaporized, nor stoichiometric, results in incomplete combustion and reduced thermal efficiency. The products of an ideal combustion process are water ($H_2O$) and carbon dioxide ($CO_2$). If combustion is incomplete, some carbon is not fully oxidized, yielding carbon monoxide (CO) and unburned hydrocarbons (HC).

The mandate to reduce air pollution has resulted in attempts to compensate for combustion inefficiencies with a multiplicity of fuel system and engine modifications. As evidenced by the prior art relating to fuel preparation and delivery systems, much effort has been directed to reducing liquid fuel droplet size, increasing system turbulence and providing sufficient heat to vaporize fuels to permit more complete combustion.

However, inefficient fuel preparation at lower engine temperatures remains a problem which results in higher emissions, requiring after-treatment and complex control strategies. Such control strategies can include exhaust gas recirculation, variable valve timing, retarded ignition timing, reduced compression ratios, the use of hydrocarbon traps and close-coupled catalytic converters and air injection to oxidize unburned hydrocarbons and produce an exothermic reaction benefiting catalytic converter light-off.

Given the relatively large proportion of unburned hydrocarbons emitted during startup, this aspect of light duty vehicle engine operation has been the focus of significant technology development efforts. Furthermore, as increasingly stringent emissions standards are enacted into legislation and consumers remain sensitive to pricing and performance, these development efforts will continue to be paramount. Such efforts to reduce start-up emissions from conventional engines generally fall into three categories: 1) reducing the warm-up time for three-way catalyst systems, 2) improving techniques for fuel vaporization and 3) capturing unburned hydrocarbons until catalyst light-off. Efforts to reduce the warm-up time for three-way catalysts to date have included: retarding the ignition timing to elevate the exhaust temperature; opening the exhaust valves prematurely; electrically heating the catalyst; burner or flame heating the catalyst; and catalytically heating the catalyst. As a whole, most of these efforts are costly and none address HC emissions during and immediately after cold start.

A variety of techniques have been proposed to address the issue of fuel vaporization. U.S. Patents proposing fuel vaporization techniques include U.S. Pat. No. 5,195,477 issued to Hudson, Jr. et al, U.S. Pat. No. 5,331,937 issued to Clarke, U.S. Pat. No. 4,886,032 issued to Asmus, U.S. Pat. No. 4,955,351 issued to Lewis et al., U.S. Pat. No. 4,458,655 issued to Oza, U.S. Pat. No. 6,189,518 issued to Cooke, U.S. Pat. No. 5,482,023 issued to Hunt, U.S. Pat. No. 6,109,247 issued to Hunt, U.S. Pat. No. 6,067,970 issued to Awarzamani et al., U.S. Pat. No. 5,947,091 issued to Krohn et al., U.S. Pat. No. 5,758,826 and U.S. Pat. No. 6,102,303 issued to Nines, U.S. Pat. No. 5,836,289 issued to Thring, and U.S. Pat. No. 5,813,388 issued to Cikanek, Jr. et al.

Key practical challenges to providing vaporized fuel include the fact that metering fuel vapor is problematic, and thus most approaches to reducing cold-start emissions focus on metering the fuel as a liquid and then vaporizing it. Heated fuel injector concepts with fuel heaters or vaporizers added on at the outlet of the injector generally suffer from poor atomization and fuel targeting once the heater is turned off. Also, heated injector and heated impingement plates suffer from an intrinsic design challenge between minimizing the power required to the heating element and minimizing the vaporizer warm-up time. For practical purposes the heating time associated with both heated injectors and heated impingement plates are too long unless excessive electrical power is supplied.

Other fuel delivery devices proposed include U.S. Pat. No. 3,716,416, which discloses a fuel-metering device for use in a fuel cell system. The fuel cell system is intended to be self-regulating, producing power at a predetermined level. The proposed fuel metering system includes a capillary flow control device for throttling the fuel flow in response to the power output of the fuel cell, rather than to provide improved fuel preparation for subsequent combustion. Instead, the fuel is intended to be fed to a fuel reformer for conversion to $H_2$ and then fed to a fuel cell. In a preferred embodiment, the capillary tubes are made of metal and the capillary itself is used as a resistor, which is in electrical contact with the power output of the fuel cell. Because the flow resistance of a vapor is greater than that of a liquid, the flow is throttled as the power output increases. The fuels suggested for use include any fluid that is easily transformed from a liquid to a vapor phase by applying heat and flows freely through a capillary. Vaporization appears to be achieved in the manner that throttling occurs in automotive engines.

U.S. Pat. No. 6,276,347 proposes a fuel injection system for an internal combustion engine wherein the system includes an electrical heating element for heating the fuel directly upstream of the discharge outlet. At engine temperatures below the normal operating temperature of the engine, the fuel is said to be heated to such a degree that a preponderant portion of the fuel to be injected is converted to the gaseous phase not later than immediately after leaving the discharge outlet.

U.S. Pat. No. 6,276,347 proposes a supercritical or near-supercritical atomizer and method for achieving atomization or vaporization of a liquid. The supercritical atomizer of U.S. Pat. No. 6,276,347 is said to enable the use of heavy fuels to fire small, light weight, low compression ratio, spark-ignition piston engines that typically burn gasoline. The atomizer is intended to create a spray of fine droplets from liquid, or liquid-like fuels, by moving the fuels toward their supercritical temperature and releasing the fuels into a region of lower pressure on the gas stability field in the phase diagram associated with the fuels, causing a fine atomization or vaporization of the fuel. Utility is disclosed for applications such as combustion engines, scientific equipment, chemical processing, waste disposal control, cleaning, etching, insect control, surface modification, humidification and vaporization.

To minimize decomposition, U.S. Pat. No. 6,276,347 proposes keeping the fuel below the supercritical temperature until passing the distal end of a restrictor for atomization. For certain applications, heating just the tip of the restrictor is desired to minimize the potential for chemical reactions or precipitations. This is said to reduce problems associated with impurities, reactants or materials in the fuel stream which otherwise tend to be driven out of solution, clogging lines and filters. Working at or near supercritical pressure suggests that the fuel supply system operate in the range of 300 to 800 psig. While the use of supercritical pressures and temperatures might reduce clogging of the atomizer, it appears to require the use of a relatively more expensive fuel pump, as well as fuel lines, fittings and the like that are capable of operating at these elevated pressures.

U.S. Pat. No. 6,390,076, a divisional of the application issuing as U.S. Pat. No. 6,276,347, also proposes a near-supercritical atomizer and method for achieving atomization or vaporization of a liquid, the claims of which are directed to its use in a burner. Staying below the supercritical point is said to prevent decomposition and/or no precipitation of components within the liquid or fluid in most applications. It is further proposed that by adjusting the heat input into the atomizing device, the liquid solution can be vaporized to various degrees. The device disclosed proposes that a distal end of a restrictor tube is coupled to a heating element to be controlled by a thermal control unit. The resistive heating element proposed for use may be a resistive tape heater of the type commonly employed for heating pipes of gas delivery systems. The thermal control unit is said to be of conventional design or may optionally operate in response to operating parameters of the engine, such as torque or RPM, to vary the degree of vaporization of fuel being ejected into the engine cylinder.

Objects and Summary of the Preferred Forms

One object is to provide a fuel system having improved fuel vaporization characteristics under most engine operating conditions, particularly cold-start and warm-up conditions.

Another object is to provide a fuel injector and delivery system capable of reducing emissions and improving fuel efficiency.

It is a still further object to provide a fuel injector and delivery system that can supply vaporized fuel while requiring minimal power and warm-up time, without the need for a high pressure fuel supply system.

These and other objects will become apparent from the detailed description of the preferred forms set out below and now summarized as follows:

A preferred form of the fuel system for use in an internal combustion engine is intended to accomplish at least one or more of the aforementioned objects. One such form includes a plurality of fuel injectors, each injector including (i) at least one capillary flow passage, the at least one capillary flow passage having an inlet end and an outlet end, (ii) a heat source arranged along the at least one capillary flow passage, the heat source operable to heat a liquid fuel in the at least one capillary flow passage to a level sufficient to convert at least a portion thereof from the liquid state to a vapor state, and (iii) a valve for metering fuel to the internal combustion engine, the valve located proximate to the outlet end of the at least one capillary flow passage, a liquid fuel supply system in fluid communication with the plurality of fuel injectors, a controller to control the power supplied to the heat source of each of the plurality of fuel injectors to achieve a predetermined target temperature, the predetermined target temperature operable to convert the portion of liquid fuel to the vapor state; means for determining engine air flow of the internal combustion engine, and a sensor for measuring a value indicative of degree of engine warm-up of the internal combustion engine, the sensor operatively connected to the controller; and wherein the portion of liquid fuel to be converted to the vapor state is controlled with reference to sensed internal combustion engine conditions to achieve minimal exhaust emissions.

The fuel system is effective in reducing cold-start and warm-up emissions of an internal combustion engine. Efficient combustion is promoted by forming an aerosol of fine droplet size when the substantially vaporized fuel condenses in air. The vaporized fuel can be supplied to a combustion chamber of an internal combustion engine during cold-start and warm-up of the engine and reduced emissions can be achieved.

One preferred form also provides a method for controlling a fuel system and delivering fuel to an internal combustion engine for a fuel system including at least one fuel injector having at least one capillary flow passage, a heat source arranged along the at least one capillary flow passage, the heat source capable of heating a liquid fuel in the at least one capillary flow passage to a level sufficient to convert at least a portion thereof from the liquid state to a vapor state, and a valve for metering fuel to the internal combustion engine, the valve located proximate to an outlet end of the at least one capillary flow passage. The method includes the steps of determining engine air flow of the internal combustion engine, measuring a value indicative of degree of engine warm-up of the internal combustion engine, determining a portion of liquid fuel to be converted to the vapor state by the at least one capillary flow passage, the determining step employing the measured values, controlling power supplied to the heat source of the at least one fuel injector to achieve a predetermined target temperature, the predetermined target temperature operable to convert the portion of liquid fuel to the vapor state so determined and delivering the fuel to a combustion chamber of the internal combustion engine and wherein the portion of liquid fuel to be converted to the vapor state is determined to achieve minimal exhaust emissions.

According to one preferred form, the capillary flow passage can include a capillary tube and the heat source can include a resistance heating element or a section of the tube heated by passing electrical current therethrough. The fuel supply can be arranged to deliver pressurized or non-pressurized liquid fuel to the flow passage. The apparatus can provide a stream of vaporized fuel that mixes with air and forms an aerosol having a mean droplet size of 25 µm or less.

In another preferred form, a means for cleaning deposits is provided. The means for cleaning deposits enables in-situ cleaning of the capillary flow passage.

BRIEF DESCRIPTION OF THE DRAWINGS

The invention will now be described in more detail with reference to preferred forms of the invention, given only by way of example, and with reference to the accompanying drawings, in which.

DETAILED DESCRIPTION OF THE PREFERRED EMBODIMENTS

Figure 1:
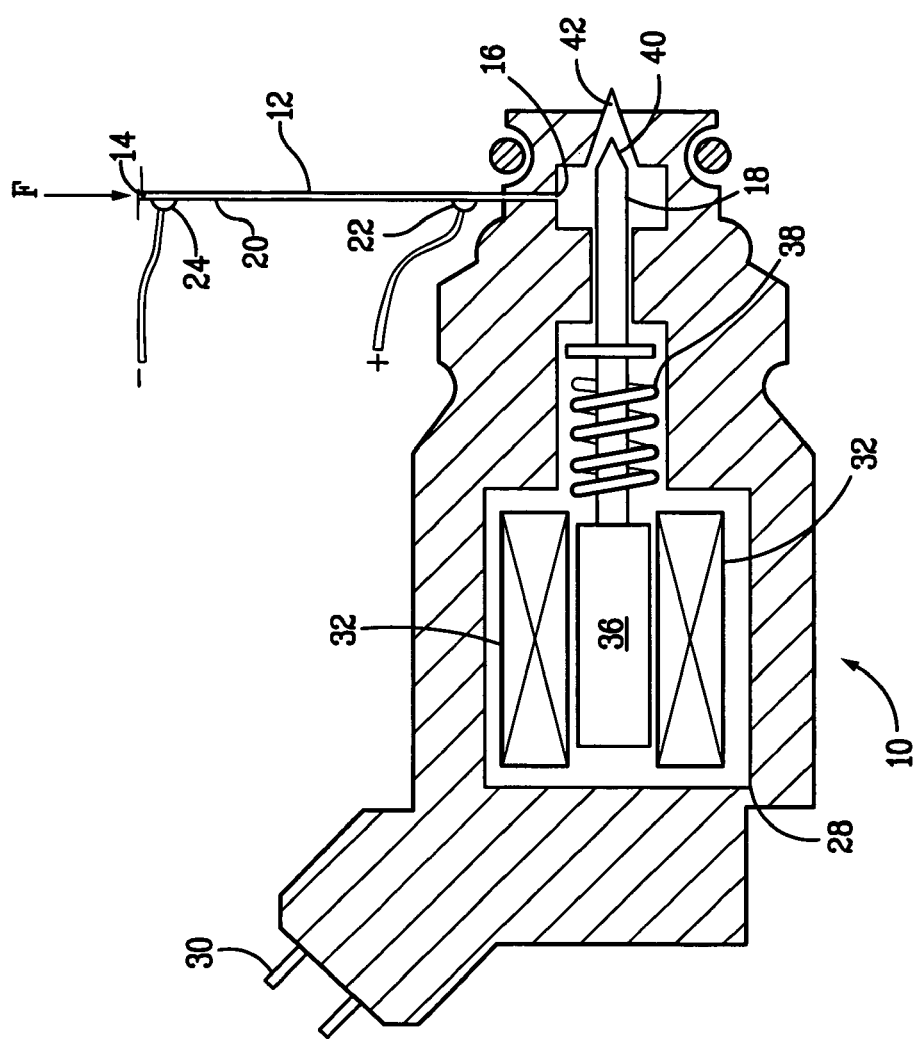
FIG. 1 illustrates an in-line-heated injector having an electrically heated capillary, in partial cross section, incorporated upstream of a modified conventional side-fed port fuel injector, in accordance with a preferred form.

Reference is now made to the embodiments illustrated in FIGS. 1-15 wherein like numerals are used to designate like parts throughout.

Provided is a fuel system and method for its control that is useful for cold-start, warm-up and normal operation of an internal combustion engine. The fuel system includes a fuel injector having a capillary flow passage, capable of heating liquid fuel so that substantially vaporized fuel is supplied into an engine cylinder. The substantially vaporized fuel can be combusted with reduced emissions compared to conventional fuel injector systems. Furthermore, the fuel system requires less power, and has shorter warm-up times than other vaporization techniques.

In general, gasolines do not readily vaporize at low temperatures. During the cold start and warm-up period, relatively little vaporization of the liquid fuel takes place. As such, it is necessary to provide an excess of liquid fuel to each cylinder of the engine in order to achieve an air/fuel mixture that will combust. Upon ignition of the fuel vapor, which is generated from the excess of liquid fuel, combustion gases discharged from the cylinders include unburned fuel and undesirable gaseous emissions. However, upon reaching normal operating temperature, the liquid fuel readily vaporizes, so that less fuel is needed to achieve an air/fuel mixture that will readily combust. Advantageously, upon reaching normal operating temperature, the air/fuel mixture can be controlled at or near stoichiometric ratio, thereby reducing emissions of unburned hydrocarbons and carbon monoxide. Additionally, when fueling is controlled at or near stoichiometric ratio, just enough air is available in the exhaust stream for simultaneous oxidation of unburned hydrocarbons and carbon monoxide and reduction of nitrogen oxides over a three-way catalyst (TWC).

The system and method of the present invention injects fuel that has been substantially vaporized into the intake flow passage, or directly into an engine cylinder, thereby eliminating the need for excess fuel during the start-up and warm-up period of an engine. The fuel is preferably delivered to the engine in a stoichiometric or fuel-lean mixture, with air, or air and diluent, so that virtually all of the fuel is burned during the cold start and warm-up period.

With conventional port-fuel injection, over-fueling is required to ensure robust, quick engine starts. Under fuel-rich conditions, the exhaust stream reaching the three-way catalyst does not contain enough air to oxidize the excess fuel and unburned hydrocarbons as the catalyst warms up. One approach to address this issue is to utilize an air pump to supply additional air to the exhaust stream upstream of the catalytic converter. The objective is to generate a stoichiometric or slightly fuel-lean exhaust stream which can react over the catalyst surface once the catalyst reaches its light-off temperature. In contrast, the system and method of the present invention enables the engine to operate at stoichiometric or even slightly fuel-lean conditions during the cold-start and warm-up period, eliminating both the need for over-fueling and the need for an additional exhaust air pump, reducing the cost and complexity of the exhaust after treatment system.

Another approach to address catalyst warm-up during the cold start and warm-up period, is to deliberately operate the engine very fuel-rich during this period. Using an exhaust air-pump to supply air in this fuel-rich exhaust stream, a combustible mixture can be generated which is burned either by auto-ignition or by some ignition source upstream of, or in, the catalytic converter. The exotherm produced by this oxidation process significantly heats up the exhaust gas and the heat is largely transferred to the catalytic converter as the exhaust passes through the catalyst. Using the system and method of the present invention, the engine could be controlled to operate alternating cylinders fuel-rich and fuel-lean to achieve the same effect but without the need for an air pump. For example, with a four-cylinder engine, two cylinders could be operated fuel-rich during the cold-start and warm-up period to generate unburned hydrocarbons in the exhaust. The two remaining cylinders would be operated fuel-lean during cold-start and warm-up, to provide oxygen in the exhaust stream.

A fuel system according to the invention includes at least one capillary-sized flow passage through which pressurized fuel flows before being injected into an engine for combustion. A capillary-sized flow passage can be provided with a hydraulic diameter that is preferably less than 2 mm, more preferably less than 1 mm, and most preferably less than 0.5 mm. Hydraulic diameter is used in calculating fluid flow through a fluid carrying element. Hydraulic radius is defined as the flow area of the fluid-carrying element divided by the perimeter of the solid boundary in contact with the fluid (generally referred to as the "wetted" perimeter). In the case of a fluid carrying element of circular cross section, the hydraulic radius when the element is flowing full is $(\pi D^2/4)/\pi D = D/4$. For the flow of fluids in noncircular fluid carrying elements, the hydraulic diameter is used. From the definition of hydraulic radius, the diameter of a fluid-carrying element having circular cross section is four times its hydraulic radius. Therefore, hydraulic diameter is defined as four times the hydraulic radius.

Heat is applied along the capillary passageway, resulting in at least a portion of the liquid fuel that enters the flow passage being converted to a vapor as it travels along the passageway. The fuel exits the capillary passageway substantially as a vapor, which optionally contains a minor proportion of heated liquid fuel, which has not been vaporized. By substantially vaporized, it is meant that at least 50% of the volume of the liquid fuel is vaporized by the heat source, more preferably at least 70%, and most preferably at least 80% of the liquid fuel is vaporized. Although it may be difficult to achieve 100% vaporization due to complex physical effects that take place, nonetheless complete vaporization would be desirable. These complex physical effects include variations in the boiling point of the fuel since the boiling point is pressure dependent and pressure can vary in the capillary flow passage. Thus, while it is believed that a major portion of the fuel, reaches the boiling point during heating in the capillary flow passage, some of the liquid fuel may not be heated enough to be fully vaporized with the result that a portion of the liquid fuel passes through the outlet of the capillary flow passage along with the vaporized fluid.

The capillary-sized fluid passage is preferably formed in a capillary body such as a single or multilayer metal, ceramic or glass body. The passage has an enclosed volume opening to an inlet and an outlet either of which, or both, may be open to the exterior of the capillary body or may be connected to another passage within the same body or another body or to fittings. The heater can be formed by a portion of the body such as a section of a stainless steel tube or the heater can be a discrete layer or wire of resistance heating material incorporated in or on the capillary body. The fluid passage may be any shape comprising an enclosed volume opening to an inlet and an outlet and through which a fluid may pass. The fluid passage may have any desired cross-section with a preferred cross-section being a circle of uniform diameter. Other capillary fluid passage cross-sections include non-circular shapes such as triangular, square, rectangular, oval or other shape and the cross section of the fluid passage need not be uniform. The fluid passage can extend rectilinearly or non-rectilinearly and may be a single fluid passage or multi-path fluid passage. In the case where the capillary passage is defined by a metal capillary tube, the tube can have an inner diameter of 0.01 to 3 mm, preferably 0.1 to 1 mm, most preferably 0.15 to 0.5 mm. Alternatively, the capillary passage can be defined by transverse cross sectional area of the passage which can be $8 \times 10^{-5}$ to 7 mm$^2$, preferably $8 \times 10^{-3}$ to $8 \times 10^{-1}$ mm$^2$ and more preferably $2 \times 10^{-2}$ to $2 \times 10^{-1}$ mm$^2$. Many combinations of a single or multiple capillaries, various pressures, various capillary lengths, amounts of heat applied to the capillary, and different cross-sectional areas will suit a given application.

The liquid fuel can be supplied to the capillary flow passage under a pressure of at least 10 psig, preferably at least 20 psig. In the case where the capillary flow passage is defined by the interior of a stainless steel tube having an internal diameter of approximately 0.020 inch and a length of approximately 6 inches, the fuel is preferably supplied to the capillary passageway at a pressure of 100 psig or less to achieve mass flow rates required for stoichiometric start of a typical size automotive engine cylinder (on the order of 100-200 mg/s). The at least one capillary passageway provides a sufficient flow of substantially vaporized fuel to ensure a stoichiometric or nearly stoichiometric mixture of fuel and air that can be ignited and combusted within the cylinder(s) of an engine without producing undesirably high levels of unburned hydrocarbons or other emissions. The capillary tube also is characterized by having a low thermal inertia, so that the capillary passageway can be brought up to the desired temperature for vaporizing fuel very quickly, preferably within 2.0 seconds, more preferably within 0.5 second, and most preferably within 0.1 second, which is beneficial in applications involving cold starting an engine. The low thermal inertia also could provide advantages during normal operation of the engine, such as by improving the responsiveness of the fuel delivery to sudden changes in engine power demands.

During vaporization of liquid fuel in a heated capillary passage, deposits of carbon and/or heavy hydrocarbons can accumulate on the capillary walls and the flow of the fuel can be severely restricted which ultimately can lead to clogging of the capillary flow passage. The rate at which these deposits accumulate is a function of capillary wall temperature, fuel flow rate and fuel type. It is believed that fuel additives may be useful in reducing such deposits. However, should clogging develop, such clogging can be cleared by oxidizing the deposits.

FIG. 1 presents a fuel injector 10 for vaporizing a liquid fuel drawn from a source of liquid fuel, in accordance with the present invention. Apparatus 10 includes a capillary flow passage 12, having an inlet end 14 and an outlet end 16, inlet end 14 in fluid communication with a liquid fuel source F for introducing the liquid fuel in a substantially liquid state into capillary flow passage 12.

As is preferred, a pintle valve assembly 18 is operated by solenoid 28. Solenoid 28 has coil windings 32 connected to electrical connector 30. When the coil windings 32 are energized, the solenoid element 36 is drawn into the center of coil windings 32. When electricity is cut off from the coil windings 32, a spring 38 returns the solenoid element to its original position. A pintle 40 is connected to the solenoid element 36. Movement of the solenoid element 36, caused by applying electricity to the coil windings 32, causes the pintle 40 to be drawn away from an orifice 42 allowing fuel to flow through the orifice 42.

A heat source 20 is arranged along capillary flow passage 12. As is most preferred, heat source 20 is provided by forming capillary flow passage 12 from a tube of electrically resistive material, a portion of capillary flow passage 12 forming a heater element when a source of electrical current is connected to the tube at connections 22 and 24 for delivering current therethrough. Heat source 20, as may be appreciated, is then operable to heat the liquid fuel in capillary flow passage 12 to a level sufficient to change at least a portion thereof from a liquid state to a vapor state and deliver a stream of substantially vaporized fuel from outlet end 16 of capillary flow passage 12.

The heated capillary flow passage 12, in accordance with the invention can produce a vaporized stream of fuel, which condenses in air to form a mixture of vaporized fuel, fuel droplets, and air commonly referred to as an aerosol. Compared to a conventional automotive port-fuel injector, which delivers a fuel spray comprised of droplets in the range of 150 to 200 μm Sauter Mean Diameter (SMD), the aerosol has an average droplet size of less than 25 μm SMD, preferably less than 15 μm SMD. Thus, the majority of the fuel droplets produced by the heated capillary according to the invention can be carried by an air stream, regardless of the flow path, into the combustion chamber.

The difference between the droplet size distributions of a conventional injector and the heated capillary flow passage according to the invention is particularly critical during cold-start and warm-up conditions. Specifically, using a conventional port-fuel injector, relatively cold intake manifold components necessitate over-fueling such that a sufficient fraction of the large fuel droplets, impinging on the intake components, are evaporated to produce an ignitable fuel/air mixture. Conversely, the vaporized fuel and fine droplets produced by the fuel injector of the present invention are essentially unaffected by the temperature of engine components upon start-up and, as such, eliminate the need for over-fueling during engine start-up conditions. The elimination of over-fueling combined with more precise control over the fuel/air ratio to the engine afforded through the use of the heated capillary injector of the present invention results in greatly reduced cold start emissions compared to those produced by engines employing conventional fuel injector systems. In addition to a reduction in over-fueling, it should also be noted that the heated capillary injector according to the invention further enables fuel-lean operation during cold-start and warm-up, which results in a greater reduction in tailpipe emissions while the catalytic converter warms up.

Referring still to FIG. 1, capillary flow passage 12 can comprise a metal tube such as a stainless steel capillary tube and the heater comprising a length of the tube 20 through which electrical current is passed. In a preferred embodiment, the capillary tube is provided with an internal diameter of approximately 0.02 to 0.03 inches, a heated length of approximately 1 to 10 inches, and fuel can be supplied to the tube 12 at a pressure of less than 100 psig, preferably less than 70 psig, more preferably less than 60 psig and even more preferably less than 45 psig. It has been shown that this embodiment produces vaporized fuel which forms a distribution of aerosol droplets which mostly range in size from 2 to 30 μm SMD with an average droplet size of about 5 to 15 μm SMD, when the vaporized fuel is condensed in air at ambient temperature. The preferred size of fuel droplets to achieve rapid and nearly complete vaporization at cold-starting temperatures is less than about 25 μm. This result can be achieved by applying approximately 100 to 400 W, e.g., 200 W of electrical power, which corresponds to 2-3% of the energy content of the vaporized fuel, to a six-inch stainless steel capillary tube. The electrical power can be applied to the capillary tube by forming the tube entirely from an electrically conductive material such as stainless steel, or by providing a conductive material over at least a portion of a non-electrically conducting tube or laminate having a flow passage therein such as by laminating or coating an electrically resistive material to form a resistance heater on the tube or laminate. The resistive component of the capillary is chosen based on the material's temperature coefficient of resistance. The temperature of the material can be controlled by applying power to achieve a target resistance. Electrical leads can be connected to the electrically conductive material to supply the electrical current to the heater so as to heat the tube along its length. Alternatives for heating the tube along its length could include inductive heating, such as by an electrical coil positioned around the flow passage, or other sources of heat positioned relative to the flow passage to heat the length of the flow passage through one or a combination of conductive, convective or radiative heat transfer.

Although, a preferred capillary tube has a heated length of approximately 6 inches and an internal diameter of approximately 0.020 inches, other configurations of capillaries provide acceptable vapor quality. For example, the internal diameter can range from 0.02 to 0.03 inch and the heated portion of the capillary tube can range from 1 to 10 inches. After cold-start and warm-up, it is not necessary to heat the capillary tube such that the unheated capillary tube can be used to supply adequate liquid fuel to an engine operating at normal temperature.

The vaporized fuel exiting from the fuel capillary according to the invention can be injected into an engine intake manifold at the same location as existing port-fuel injectors or at another location along the intake manifold. If desired, however, the fuel capillary can be arranged to deliver vaporized fuel directly into each cylinder of the engine. The fuel capillary provides advantages over systems that produce larger droplets of fuel that must be injected against the back side of a closed intake valve while starting the engine. Preferably, the outlet of the fuel capillary tube is positioned flush with the intake manifold wall similar to the arrangement of the outlets of conventional fuel injectors.

After approximately 20 seconds (or preferably less) from starting the engine, the power used to heat the capillary flow passage 12 can be turned off and liquid injection initiated using conventional fuel injectors, for normal engine operation. Normal engine operation can alternatively be performed by liquid fuel injection through an unheated capillary flow passage 12 via continuous injection or possibly pulsed injection.

Figure 2:
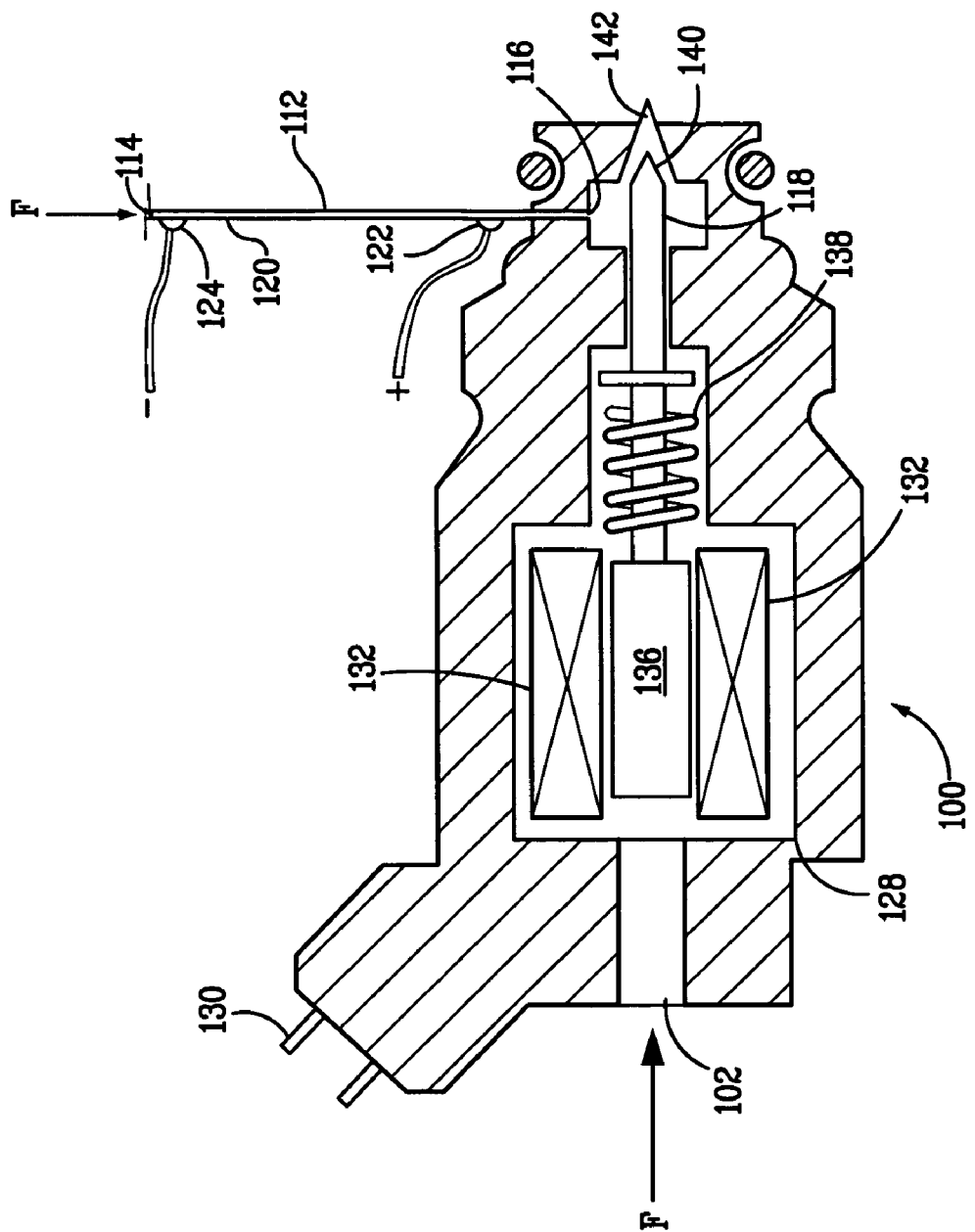
FIG. 2 presents another vapor-liquid in-line-heated injector having an electrically heated capillary, in partial cross section, capable of also providing a stream of liquid fuel according to another preferred form.

Referring to FIG. 2, a dual vapor/liquid fuel injector 100, in accordance with the present invention, is shown. Vapor/liquid fuel injector 100 includes a capillary flow passage 112, having an inlet end 114 and an outlet end 116, inlet end 114 in fluid communication with a liquid fuel source F for introducing the liquid fuel in a substantially liquid state into capillary flow passage 112 and liquid passage 102.

A pintle valve assembly 118 is operated by solenoid 128 and is used to control the flow of fuel from capillary flow passage 112 and/or liquid passage 102. Solenoid 128 has coil windings 132 connected to electrical connector 130. When the coil windings 132 are energized, the solenoid element 136 is drawn into the center of coil windings 132. As previously described, when electricity is cut off from the coil windings 132, a spring 138 returns the solenoid element to its original position. A pintle 140 is connected to the solenoid element 136. Movement of the solenoid element 136, caused by applying electricity to the coil windings 132, causes the pintle 140 to be drawn away from an orifice 142 allowing fuel to flow through the orifice 142.

A heat source 120 is arranged along capillary flow passage 112. As is most preferred, heat source 120 is provided by forming capillary flow passage 112 from a tube of electrically resistive material, a portion of capillary flow passage 112 forming a heater element when a source of electrical current is connected to the tube at connections 122 and 124 for delivering current. Heat source 120, as may be appreciated, is then operable to heat the liquid fuel in capillary flow passage 112 to a level sufficient to change at least a portion thereof from a liquid state to a vapor state and deliver a stream of substantially vaporized fuel from outlet end 116 of capillary flow passage 112. After about 20 seconds from starting the engine, or preferably less, flow to the capillary flow passage 112 can be terminated and the conventional liquid passage 102 activated for continued operation of the engine.

Figure 3:
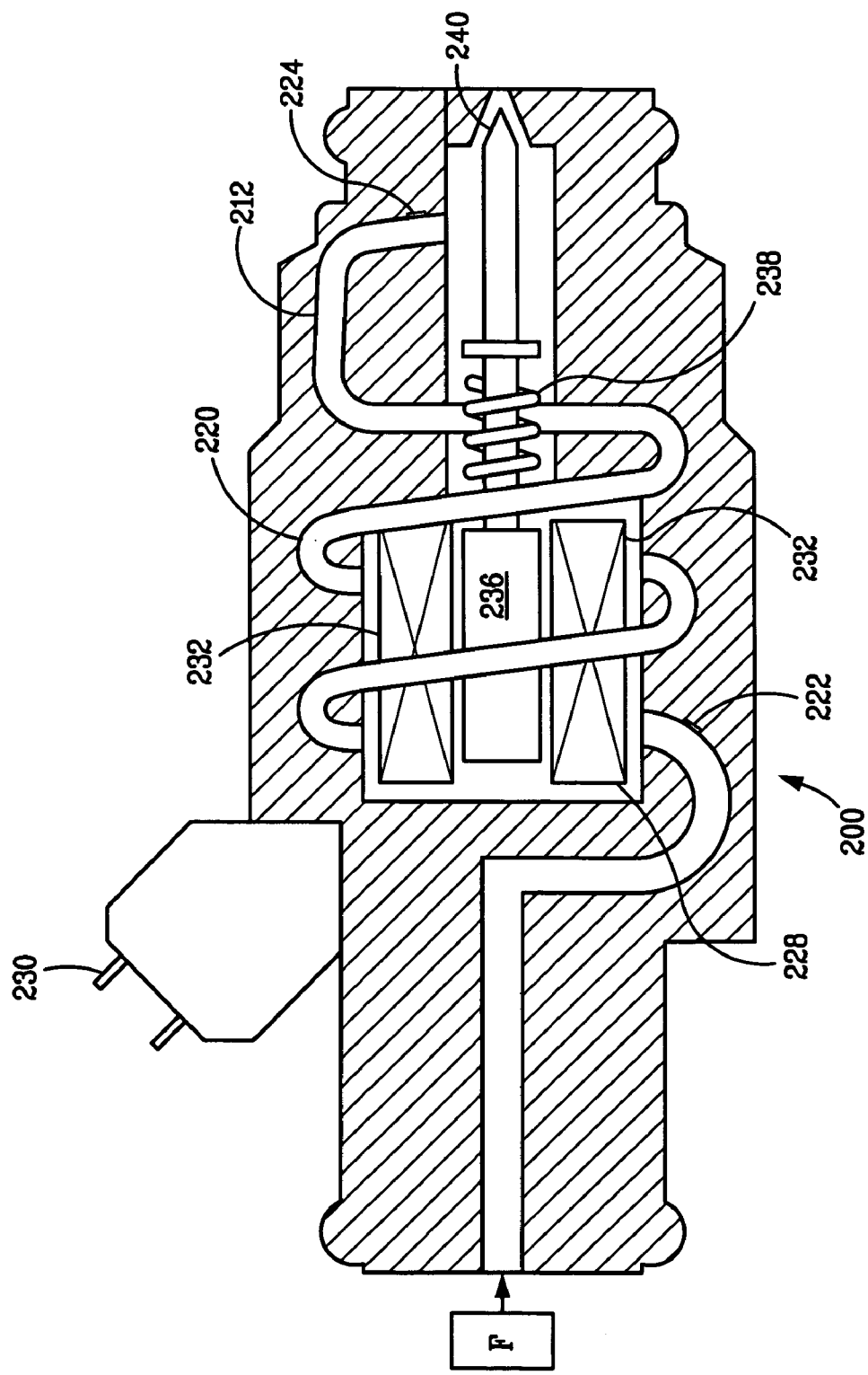
FIG. 3 is a cross-sectional view of another embodiment of the fuel injector according to yet another preferred form.

Referring now to FIG. 3, yet another exemplary embodiment of the present invention is shown. A fuel injector 200 has a non-linear (helical) heated capillary flow passage 212 which is coiled within the interior of the fuel injector 200 as illustrated in FIG. 3. In this embodiment, the capillary flow passage 212 is coiled around the solenoid assembly 228 and is heated along heated length 220, defined by electrical connections 222 and 224. This embodiment is useful in a situation where space is limited and a linear capillary tube is not feasible. In addition, this embodiment could be adapted for use with a conventional fuel injector (see FIG. 4) for delivering fuel to an engine during normal operating conditions.

Figure 4:
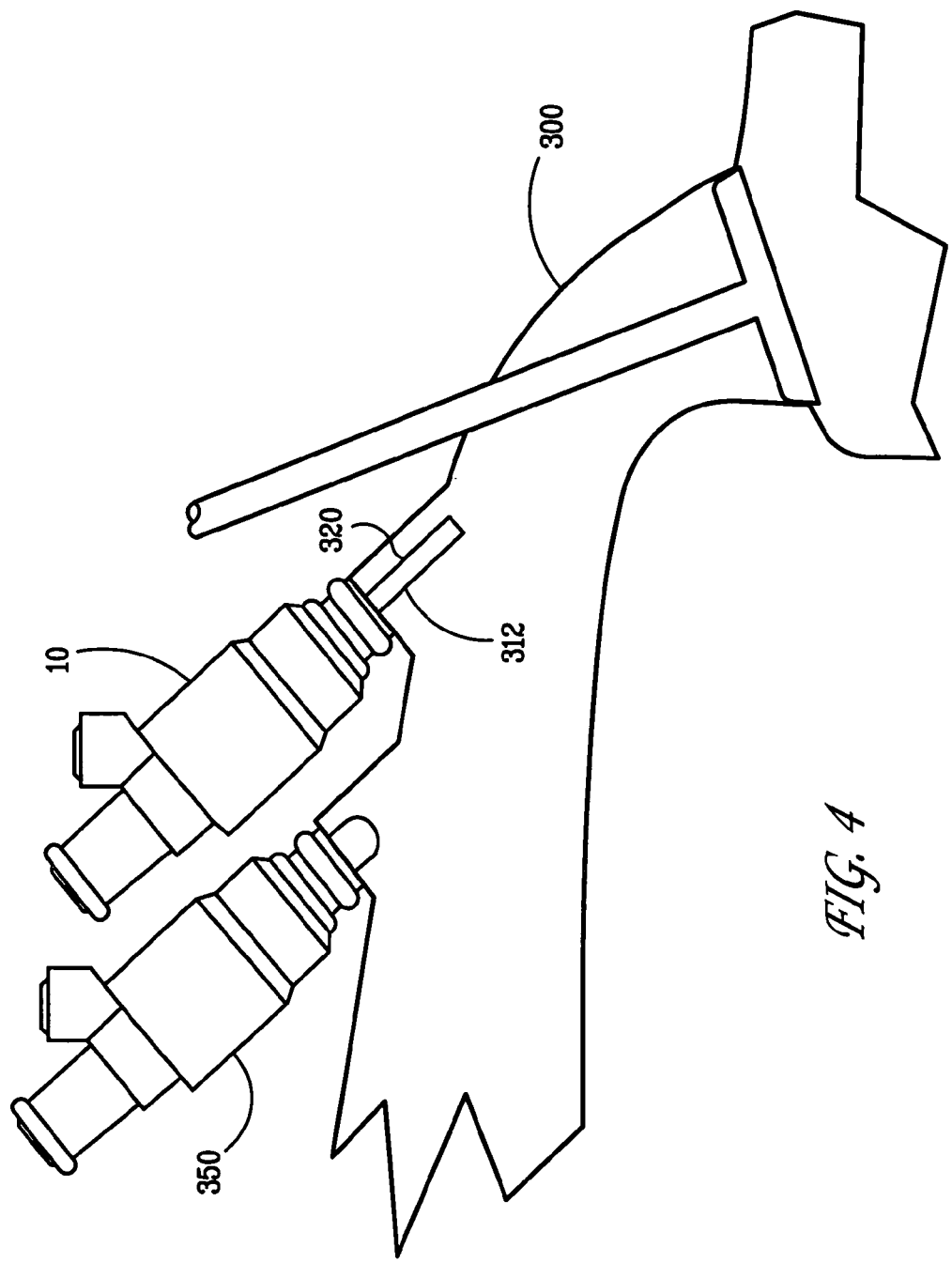
FIG. 4 is a side view of another embodiment employing dual injectors in accordance with still another preferred form.

Referring now to FIG. 4, an engine intake port 300 is fitted with a heated capillary injector 10 (of the type described with reference to FIG. 1) and a conventional liquid fuel injector 350. In this embodiment, fuel will be delivered to the engine by the capillary flow passage 312, heated along its length 320, during the cold-start and warm-up of the engine. After the first approximately 20 seconds from starting the engine, or preferably less, the heated capillary injector 10 will be deactivated and the conventional fuel injector 350 activated for normal operation of the engine.

As will be appreciated, the apparatus and system for preparing and delivering fuel depicted in FIGS. 1 through 4 may also be used in connection with another embodiment of the present invention. Referring again to FIG. 1, apparatus 10 may also include means for cleaning deposits formed during operation of apparatus 10. The means for cleaning deposits may include heat source 20 and an oxidizer control valve (see 420 of FIG. 5) for placing capillary flow passage 12 in fluid communication with a source of oxidizer. As may be appreciated, the oxidizer control valve can be located at or near either end of capillary flow passage 12. In operation, heat source 20 is used to heat the oxidizer in capillary flow passage 12 to a level sufficient to oxidize deposits formed during the heating of the liquid fuel F. In one embodiment, to switch from a fueling mode to a cleaning mode, the oxidizer control valve (see 420 of FIG. 5) is operable to alternate between the introduction of liquid fuel F and the introduction of oxidizer into capillary flow passage 12 and enable in-situ cleaning of capillary flow passage 12 when the oxidizer is introduced into the at least one capillary flow passage 12.

Figure 5:
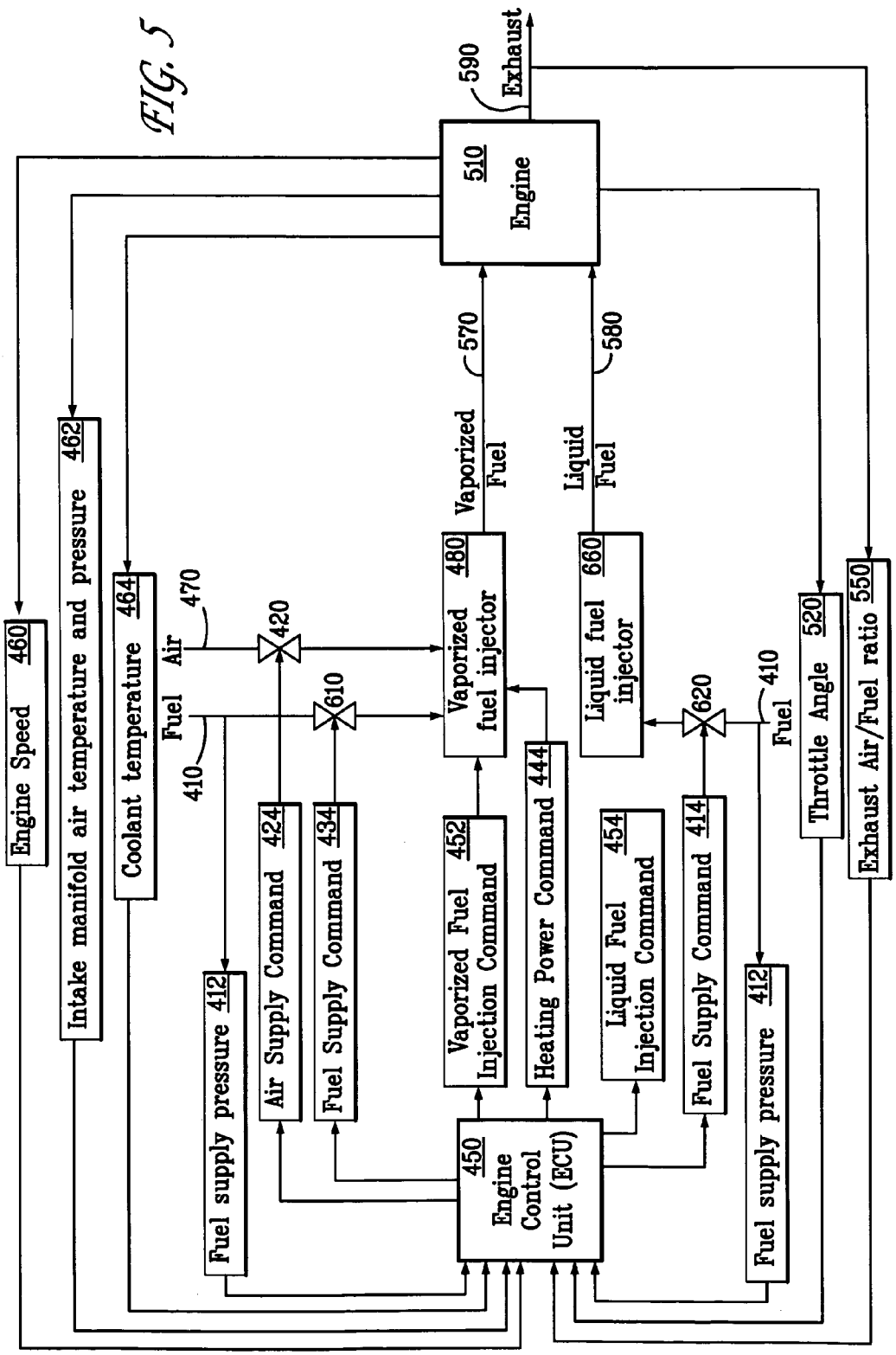
FIG. 5 is a schematic of a fuel delivery and engine/controller system in which a separate vapor fuel injector is used in conjunction with a conventional fuel injector.

One technique for oxidizing deposits includes passing air through the capillary, as shown in FIG. 5. The flow passage is preferably heated during the cleaning operation so that the oxidation process is initiated and nurtured until the deposits are consumed. To enhance this cleaning operation, a catalytic substance may be employed, either as a coating on, or as a component of, the capillary wall to reduce the temperature and/or time required for accomplishing the cleaning. For continuous operation of the fuel delivery system, more than one capillary flow passage can be used such that when a clogged condition is detected, such as by the use of a sensor or a change in capillary resistance, fuel flow can be diverted to another capillary flow passage and oxidant flow initiated through the clogged capillary flow passage to be cleaned. As an example, a capillary body can include a plurality of capillary flow passages therein and a valving arrangement can be provided to selectively supply liquid fuel or air to each flow passage.

Alternatively, fuel flow can be diverted from a capillary flow passage and oxidant flow initiated at preset intervals. As shown in FIG. 5, fuel delivery to a capillary flow passage can be effected by a controller 450. For example, the controller 450 can activate fuel delivery for a preset time period and deactivate fuel delivery after the preset amount of time. The controller 450 may also effect adjustment of the pressure of the liquid fuel and/or the amount of heat supplied to the capillary flow passage based on one or more sensed conditions, as will be explained below. The sensed conditions may include inter alia: the fuel pressure 412, the capillary temperature, and the air fuel mixture 550. The controller 450 may also control multiple fuel delivery devices attached to the application. As will be appreciated by those skilled in the art, the controller 450 may also control one or more capillary flow passages to clear deposits. For example, cleaning of a capillary flow passage can be achieved by applying heat to the capillary flow passage and supplying a flow of an oxidant source to the capillary flow passage.

As an alternative, the apparatus and system for preparing and delivering fuel depicted in FIGS. 1 through 4 may also include an alternate means for cleaning deposits. Referring again to FIG. 1, the means for cleaning deposits includes placing capillary flow passage 12 in fluid communication with a solvent, enabling the in-situ cleaning of capillary flow passage 12 when the solvent is introduced into capillary flow passage 12. While a wide variety of solvents have utility, the solvent may comprise liquid fuel from the liquid fuel source. When this is the case, no additional valve is required, as there is no need to alternate between fuel and solvent. The heat source should be phased-out over time or deactivated during the cleaning of capillary flow passage 12.

A capillary fuel injector, of the type shown in FIG. 1, may be used together with a conventional liquid fuel injector, as shown in FIG. 4, together with the control system shown in FIG. 5. FIG. 5 shows an exemplary schematic of a control system 400 used to operate an internal combustion engine 510 incorporating a liquid fuel supply valve 620 in fluid communication with a liquid fuel supply 410 and a liquid fuel injection path 660, a vaporized fuel supply valve 610 in fluid communication with a liquid fuel supply 410 and capillary flow passages 480, and an oxidizing gas supply valve 420 in fluid communication with an oxidizing gas supply 470 and capillary flow passages 480. The control system includes a controller 450 which typically receives a plurality of input signals from a variety of engine sensors such as engine speed sensor 460, intake manifold air thermocouple 462, coolant temperature sensor 464, exhaust air-fuel ratio sensor 550, fuel supply pressure 412, etc. In operation, the controller 450 executes a control algorithm based on one or more input signals and subsequently generates an output signal 424 to the oxidizer supply valve 420 for cleaning clogged capillary passages in accordance with the invention, an output signal 414 to the liquid fuel supply valve 620, an output signal 434 to the vaporized fuel supply valve 610, and a heating power command 444 to a power supply which delivers power to heat to the capillaries 480.

In operation, the system according to the invention can be configured to feed back heat produced during combustion through the use of exhaust gas recycle heating, such that the liquid fuel is heated sufficiently to substantially vaporize the liquid fuel as it passes through the capillary flow passages 480 reducing or eliminating or supplementing the need to electrically or otherwise heat the capillary flow passages 480.

As may be seen, in the configuration of FIG. 5, the input signals to the engine control unit (ECU) 450, respectively, include fuel supply pressure 412, coolant temperature 464, intake manifold air temperature and pressure 462, engine speed 460, throttle angle 520, and exhaust air/fuel ratio 550. Similarly, the output signals from the ECU 450 are shown to include an air supply command 424, a fuel supply command 434, a fuel injection command 452 and a heating power command 444.

Figure 6:
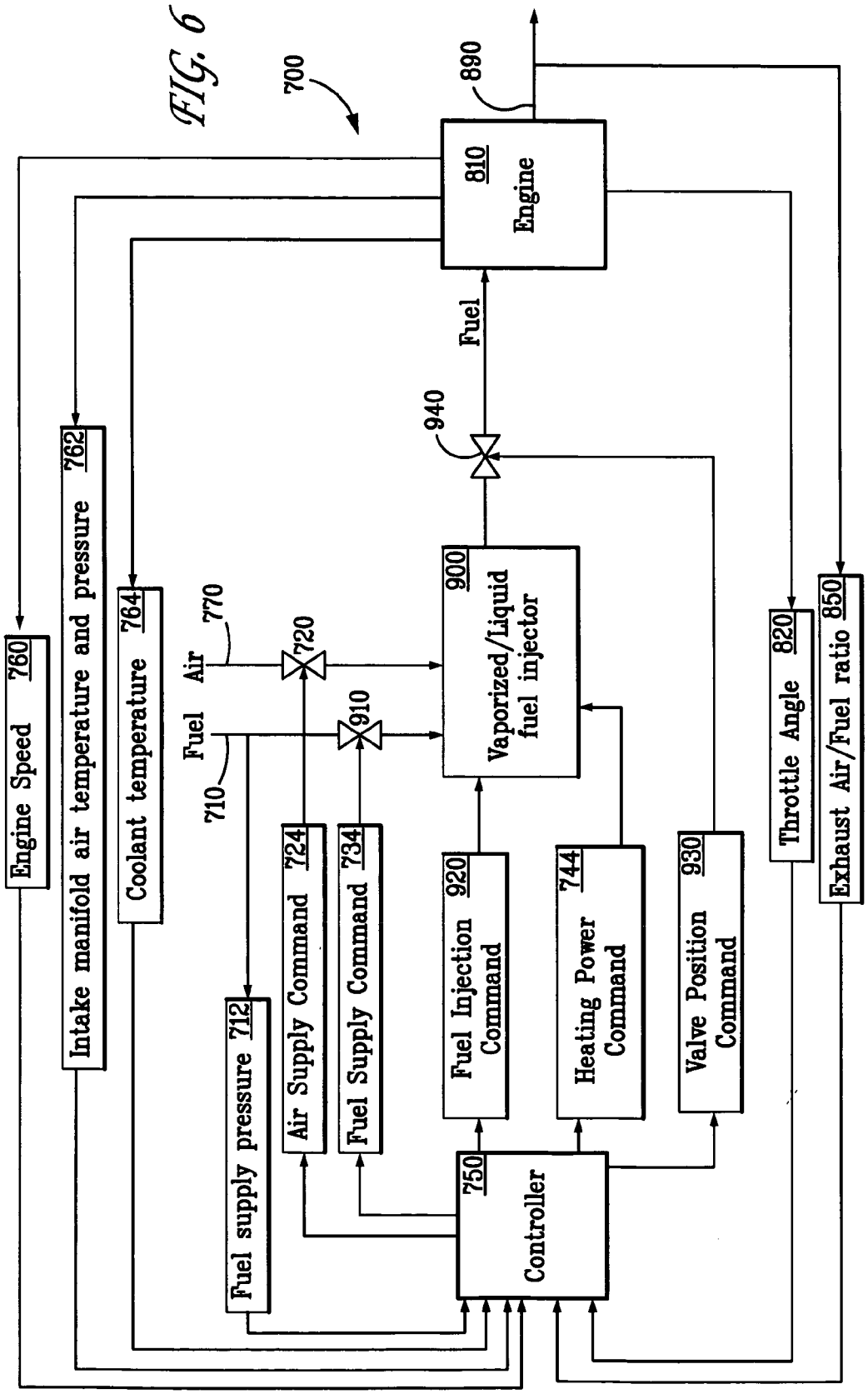
FIG. 6 is a schematic of an engine/controller configuration in which a vapor/liquid fuel injector is used to deliver both vaporized and liquid fuel to the engine, in accordance with still another preferred form.

Alternatively, a fuel injector may be configured such that it accommodates the delivery of both liquid and vapor fuel, as shown in FIG. 2. FIG. 6 shows an exemplary schematic of a control system 700 used to operate an internal combustion engine 810 incorporating a fuel supply valve 940 in fluid communication with a liquid fuel supply 710 and a fuel injection path 900, and an oxidizing gas supply valve 720 in fluid communication with an oxidizing gas supply 770 and capillary flow passages. The control system includes a controller 750 which typically receives a plurality of input signals from a variety of engine sensors such as engine speed sensor 760, intake manifold air thermocouple 762, coolant temperature sensor 764, exhaust air-fuel ratio sensor 850 and fuel supply pressure 712. In operation, the controller 750 executes a control algorithm based on one or more input signals and subsequently generates an output signal 724 to the oxidizer supply valve 720 for cleaning clogged capillary passages in accordance with one embodiment of the invention, an output signal 930 to the fuel supply valve 940, an output signal 734 to the fuel supply valve 910, and a heating power command 744 to a power supply which delivers power to heat to the capillaries.

Still referring now to FIG. 6, signals to the engine control unit (ECU) 750, respectively, include fuel supply pressure 712, coolant temperature 764, intake manifold air temperature and pressure 764, engine speed 760, throttle angle 820, and exhaust air/fuel ratio 850. Similarly, the output signals from the ECU 850 are an air supply command 724, a fuel supply command 734, a fuel injection command 920 and a heating power command 744. A valve position command control signal 930 is used since the vaporized fuel flow can be pulsed for open valve injection. As may be seen by reference to FIG. 2, fuel and vapor will flow through the same exit path out of the injector. However, the open area required for the flow of liquid fuel is smaller than that required for vapor fuel injection.

As may be appreciated, in each of the embodiments of FIG. 5 and FIG. 6, signals from the engine are sent to the engine controller, which then uses these signals to perform several functions related to the injection of vaporized fuel including determining the type of fuel (liquid or vapor) that should be delivered to the engine for minimal emissions, injecting the appropriate amount of fuel in order to start and warm-up the engine and minimize emissions, controlling the power supplied to the capillary flow passages to achieve a target resistance, which translates into a desired target temperature and phasing over to liquid fuel injection.

Figure 7:
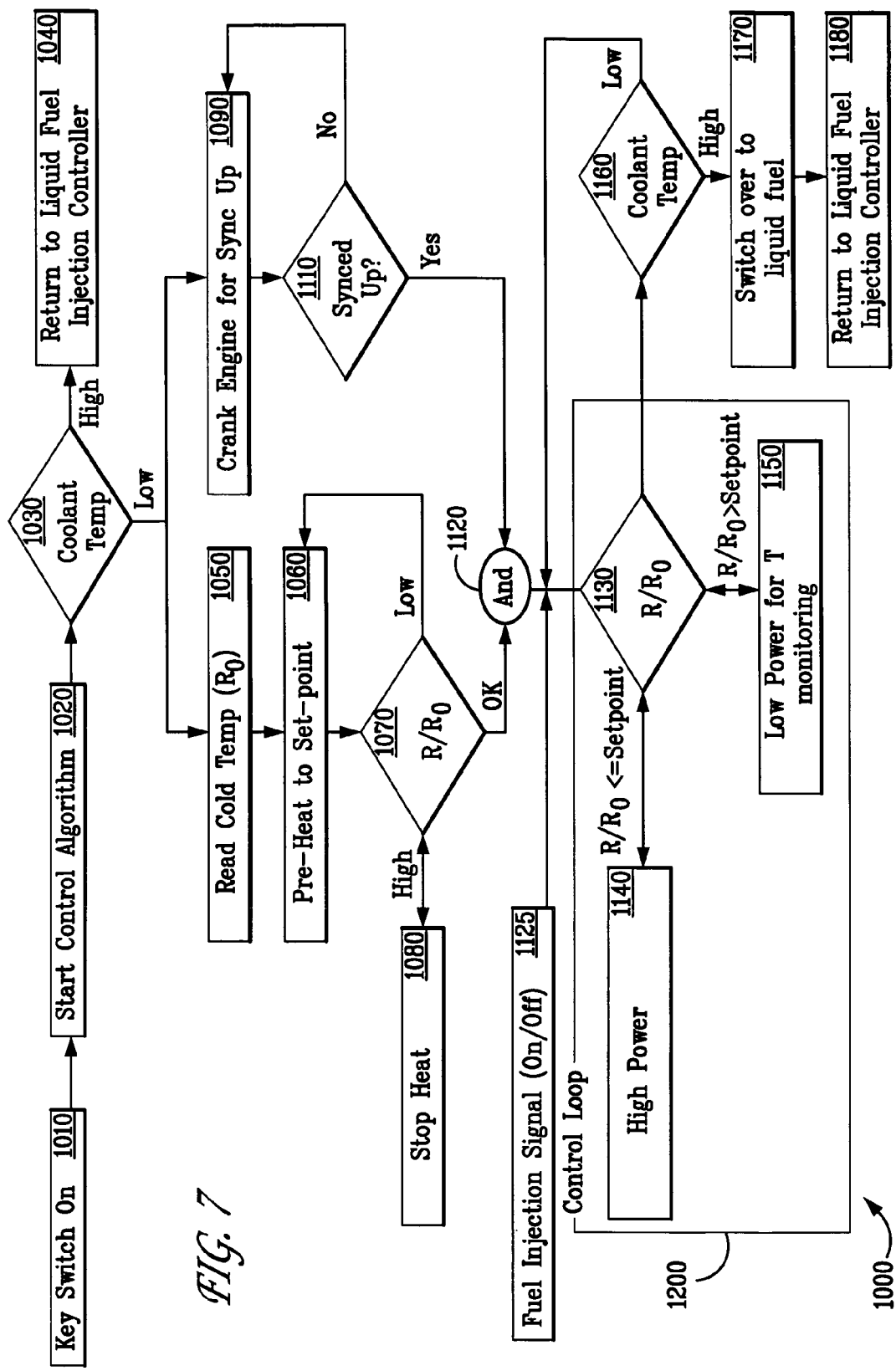
FIG. 7 is a vapor/liquid fuel injector control algorithm in which power to the injector is controlled via a binary (high/low) power source, in accordance with still another preferred form.

An example of a preferred control algorithm is shown schematically in FIG. 7. The fuel injector control algorithm 1000 of FIG. 7 controls power to the injector via a binary (high/low) power source. In the determination of the type of fuel (liquid or vapor) to be delivered to the engine, the start control algorithm 1020 begins with the key switch on 1010 of the automobile. At the start of the control algorithm 1000, the signal 1030, which may be coolant temperature or other signal representative of degree of engine warm-up (e.g., lubricant temperature, ambient temperature or time elapsed from engine start-up) is compared to a set-point. If the coolant or lubricant or ambient air temperature, as the case may be, is greater than or equal to the set-point, the engine controller will specify liquid fuel delivery to the engine 1040. Likewise, if the time elapsed from engine start-up is greater than or equal to a set-point (e.g. 5 minutes), the engine controller will specify liquid fuel delivery to the engine 1040.

Alternatively, if the signal representative of degree of engine warm-up, such as coolant temperature, is below the set-point, the ECU will pre-heat the capillary flow passage. 1060 and, optionally, synchronize the engine 1090 for open valve injection through increased cranking time. In the embodiment of FIG. 7, the capillary flow passage preheat temperature is achieved through a basic on/off control loop in which heat is supplied to the capillary until the target temperature 1070 (resistance) is measured. When the temperature reaches the target value 1070, and the engine is still cranking, the heat to the capillary flow passage is removed (1080) for a short period of time to allow the temperature to drop slightly. After this short "off" period, power is again supplied to the capillary flow passage in order to measure the temperature. At this point the control loop is continued.

Once the capillary target temperature 1070 is reached and, optionally, the engine is synchronized for open valve injection 1090, the injector is set to receive the fuel injection command from the ECU. Given the relatively low thermal mass associated with the heated capillary delivery method, this warm-up process is expected to take significantly less than 0.5 seconds and, more preferably on the order of 0.1 seconds. Thus, the rate-limiting step in this phase of injector operation will be the synchronization of the engine 1090, if such a process is included in the engine start-up strategy.

In the injection of the appropriate amount of fuel for cold-start and warm-up of the engine, the amount of liquid fuel that is introduced into the engine during cold-start and warm-up is determined in accordance with the means, represented schematically in FIG. 5 and FIG. 6. Referring again to FIG. 5 and FIG. 6, as may be appreciated, this phase of fuel injection may be governed by an open-loop control algorithm in which the amount of fuel injected is determined through look-up maps based on factors such as engine speed 460 and 760, respectively and accelerator position 520 and 820, respectively. Alternatively, fuel injection may be governed by a feedback control loop in which the exhaust air/fuel ratio signal 550 and 850, respectively are used to determine the injected amount of fuel or a predictive control algorithm governed by the throttle position 520 and 820. In still another embodiment, the throttle position signal 520 and 820, respectively, is passed to the ECU 450 and 750 and a predictive control strategy is used to determine the quantity of fuel required for the given engine conditions.

Referring again to FIG. 7, to ensure that high quality vapor is injected into the engine throughout the cold-start and warm-up period, a technique is provided for controlling the power to the capillary flow passage to maintain a target resistance (i.e., temperature), as the fuel delivery is pulsed and/or the engine fueling requirements change. This is depicted in the "Control Loop" 1200 in FIG. 7. As shown in FIG. 7, the resistance of the capillary flow passage is used as a feedback to determine the appropriate adjustment in power to the capillary flow passage to maintain the target ratio of measured resistance to cold capillary flow passage resistance (R/Ro) 1130.

The embodiment shown in FIG. 7 depicts a step-wise or digital control algorithm where high power 1140 is supplied to heat the capillary if R/Ro 1130 is less than or equal to the set point. Conversely, low power 1150 is supplied to the capillary flow passage when R/Ro 1130 is greater than the set-point. Under such low power conditions the device undergoes convective cooling while resistance is measured and passed back to the controller.

Figure 8:
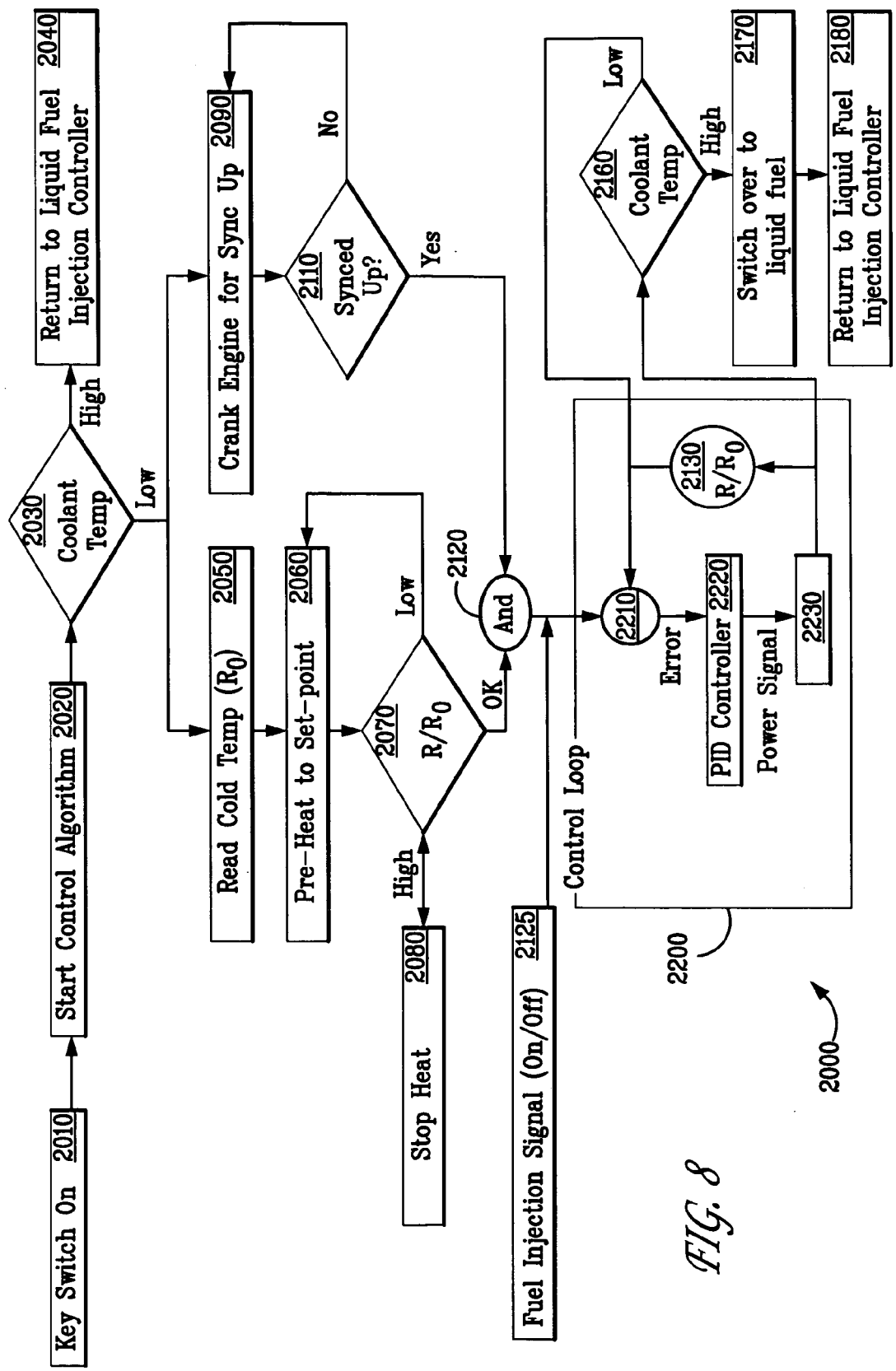
FIG. 8 is a vapor/liquid fuel injector control algorithm in which power to the injector is controlled via a proportional integral derivative controller, in accordance with still another preferred form.

Referring now to FIG. 8, a vapor/liquid fuel injector control algorithm 2000 in which power to the injector is controlled via a proportional integral derivative controller (PID) is shown. PID controllers are available from a wide variety of companies, including West Instrument, LFE, Watlow and Gentran, as well as automotive control suppliers. PID controllers advantageously provide for the accurate maintenance of a control setpoint by adjusting the control outputs. This permits a temperature to be controlled with minimal oscillations around the setpoint.

In the control algorithm of FIG. 8, the start control algorithm 2020 begins with the key switch on 2010 of the automobile. At the start of this control algorithm 2000, the coolant temperature 2030 or other signal representative of degree of engine warm-up (e.g., lubricant temperature, ambient temperature or time elapsed from engine start-up) is compared to a set-point. If the coolant or lubricant or ambient air temperature, as the case may be, is greater than or equal to the set-point, the engine controller will specify liquid fuel delivery to the engine 2040. Likewise, if the time elapsed from engine start-up is greater than or equal to a set-point (e.g. 5 minutes), the engine controller will specify liquid fuel delivery to the engine 2040.

Alternatively, if the signal representative of degree of engine warm-up, such as coolant temperature, is below the set-point, the ECU will pre-heat the capillary flow passage 2060 and, optionally, synchronize the engine 2090 for open valve injection through increased cranking time. It is important to note that several types of control methodologies including a model-based control can also be used.

Once the capillary target temperature 2060 is reached and, optionally, the engine is synchronized for open valve injection 2090, the injector is set to receive the fuel injection command from the ECU. Again, since this warm-up process is expected to take significantly less than 0.5 seconds and, more preferably on the order of 0.1 seconds, the rate-limiting step will be the synchronization of the engine 2090, if such a process is included in the engine start-up strategy.

Still referring to FIG. 8, to inject the appropriate amount of fuel for cold-start and warm-up of the engine, the amount of liquid fuel that is introduced into the engine during cold-start and warm-up is determined in accordance with the systems represented schematically in FIG. 5 and FIG. 6. Referring again to FIG. 5 and FIG. 6, as may be appreciated, this phase of fuel injection may be governed by an open-loop control algorithm in which the amount of fuel injected is determined through look-up maps based on factors such as engine speed 460 and 760, respectively and accelerator position 520 and 820, respectively. Alternatively, fuel injection may be governed by a feedback control loop in which the exhaust air/fuel ratio signal 550 and 850, respectively are Used to determine the injected amount of fuel or a predictive control algorithm governed by the throttle position 520 and 820. In still another embodiment, the throttle position signal 520 and 820, respectively, is passed to the ECU 450 and 750 and a predictive control strategy is used to determine the quantity of fuel required for the given engine conditions.

Referring again to FIG. 8, to ensure that high quality vapor is injected into the engine throughout the cold-start and warm-up period, the present invention specifies a method of controlling the power to the capillary flow passage to maintain a target resistance (i.e., temperature) 2130, as the fuel delivery is pulsed and/or the engine fueling requirements change. This is shown as the "Control Loop" 2200. As shown in FIG. 8, the resistance of the capillary flow passage is used as a feedback to determine the appropriate adjustment in power to the capillary flow passage to maintain the target ratio of measured resistance to cold capillary flow passage resistance (R/Ro) 2130.

The embodiment shown in FIG. 8 depicts an analog control algorithm (a PID controller) where the resistance of the capillary flow passage in the previous time-step is used as the basis for a finite correction to the power supplied to the capillary flow passage in the current time-step. Through such an analog control methodology, the power supplied to the capillary flow passage may span the entire spectrum from zero to the maximum allowable value. However, ideally, the power to the capillary flow passage will be significantly less than the available power such that the control algorithm can effectively respond to sudden changes in engine operating conditions.

As those skilled in the art will readily understand, look-ahead controls are incorporated into the capillary flow passage control algorithm. Specifically, the intake valve actuation signal is incorporated into the control algorithm such that this signal serves as a precursor to the flow of fuel through the one or more capillary flow passages. Upon receiving the intake valve actuation signal, the power to the capillary flow passage is increased such that the capillary flow passage is at sufficient temperature to fully vaporize the fuel flow once the fuel injector is open.

As implied above, the use of an appropriate resistance set-point is critical to the performance of the capillary flow passage-based fuel injector. That is, a low set-point will result in a lack of heat delivered to the fuel which, in turn, will result in poor quality vapor delivered to the engine. Conversely, a high set-point will result in a local hot spot near the end of the capillary such that the temperature of the rest of the capillary is significantly lower than the mean temperature as represented by the resistance of the capillary. Consequently, such a condition results in poor vapor quality as well.

Figure 9:
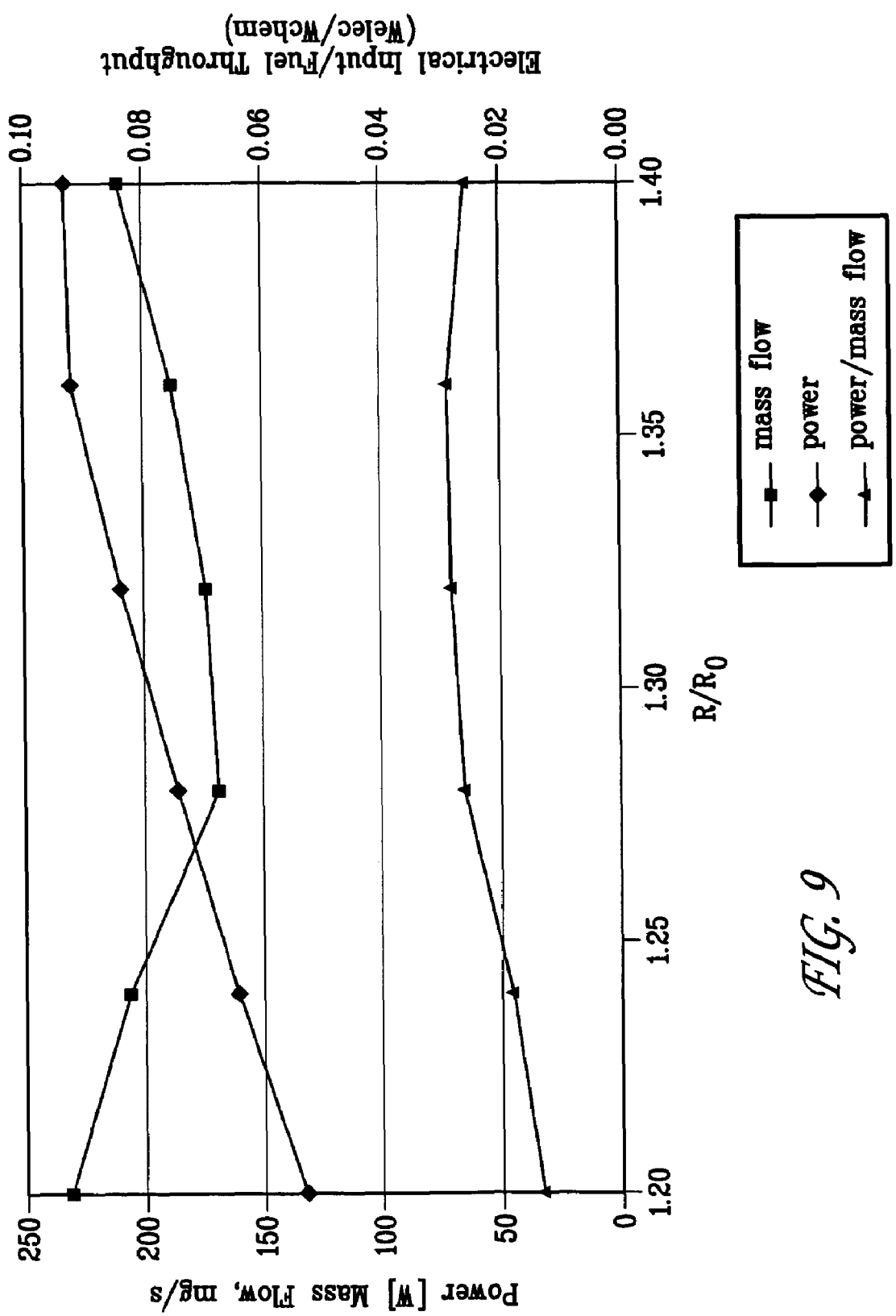
FIG. 9 is an empirically determined resistance set-point for a vapor fuel injector.

Based on these observations, it has been empirically determined that the preferred resistance set-point for a given capillary generally corresponds to the point at which the ratio of power to mass flow through the capillary is maximized. An example of the empirically determined resistance set-point for a capillary passage is shown in FIG. 9. It is important to note that a preferred resistance set-point for a given capillary flow passage is largely insensitive to fuel pressure.

As indicated in FIG. 7 and FIG. 8, in parallel to the control of R/Ro 1130 and 2130, respectively, the coolant temperature 1160 and 2160 is continually compared to the set-point, which signifies fully warm engine conditions. If the coolant temperature is below the respective set-point, heat continues to be supplied to the capillary flow passage via the capillary flow passage control loop 1200 and 2200, respectively, and, thus, high quality fuel vapor continues to be delivered to the engine. Conversely, if the coolant temperature 1160 and 2160 is above the set-point for warm engine operation, the control algorithm begins the phase over to liquid fuel.

Referring again to FIG. 5, the process of switching over from vaporized to liquid fuel can take any of several forms and will be a function of the particular capillary flow passage injector configuration employed. In one approach to switching over to liquid fuel, the coolant temperature signal 464 is used to actuate a switching valve 610 and 620 and optionally disable power to the capillary flow passage, which directs the fuel supply away from the capillary flow passage 480 and toward a conventional liquid fuel injection flow passage 660. In practice, this approach will require the fuel injector configuration shown schematically in FIG. 4.

In conjunction with an injector configuration generally depicted in FIG. 6, whereby both vaporized and liquid fuel are delivered to the engine via the same flow passage 900, the coolant temperature signal 764 is used to disable power to the capillary flow passage and actuate (930) a change at the injector exit 940 or a change in the injector duty cycle that will result in a smaller orifice size. The orifice size at the injector exit 940 will be a function of the vapor quality exiting the injector. However, given the very low thermal inertia associated with the capillary flow passages disclosed herein used to vaporize fuel, the change over from vapor to liquid fuel injection through the removal of power to the capillary can be approximated as binary in practice.

The control strategy of the present invention advantageously employs several different modes, including: fully vaporized fuel (primarily during cranking and start-up of the engine), heated fuel that flash vaporizes as it undergoes the sudden pressure drop in exiting the fuel injector into the intake manifold, primarily during cold start idle and first FTP transient, and unheated liquid fuel, primarily for normal operating following cold-start and initial warm-up.

Figure 10:
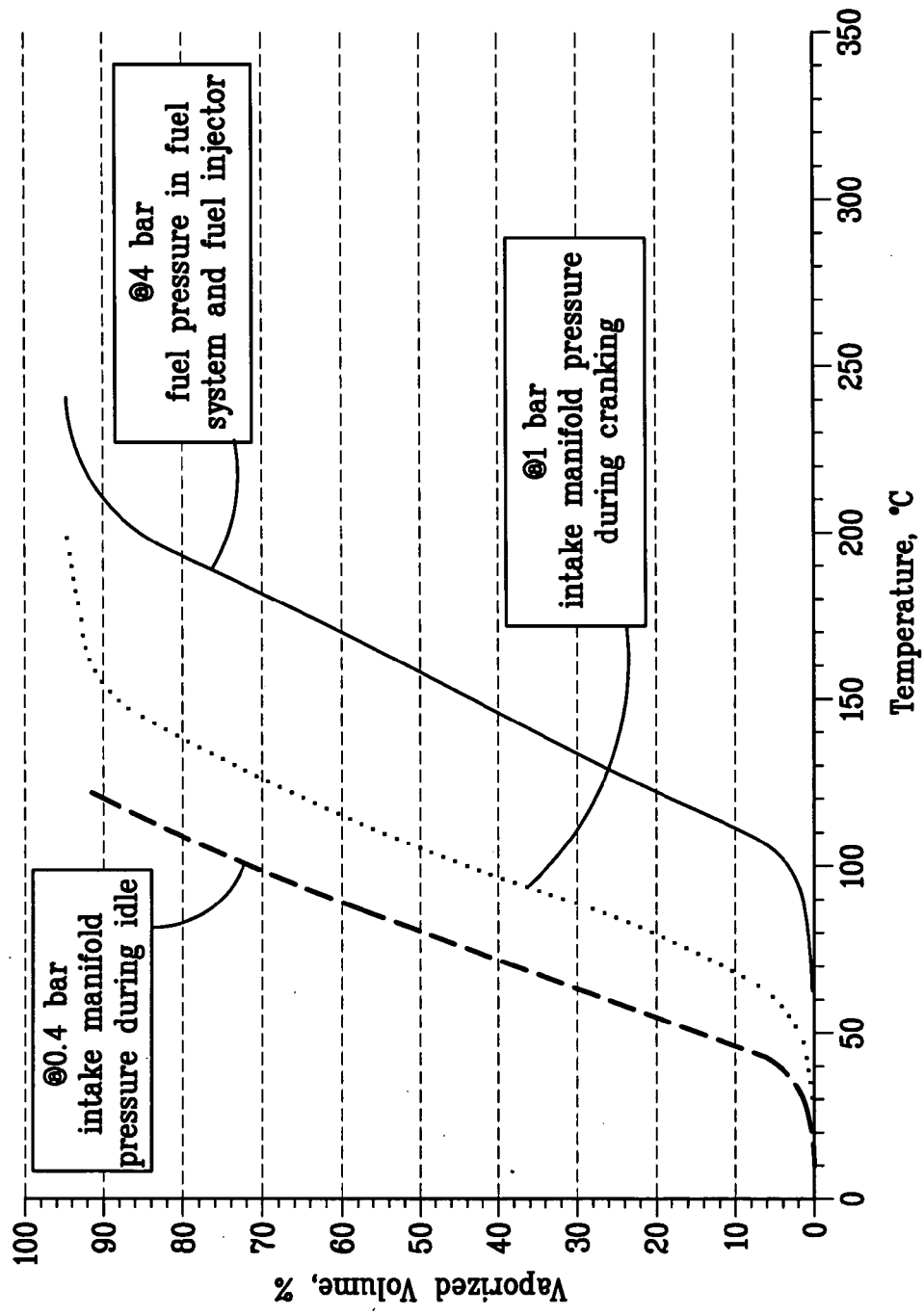
FIG. 10 shows typical fuel vapor curves for commercial gasoline at different pressures.

To design the set points required to implement this strategy, knowledge of the distillation (or vapor) curve for the fuel of interest is required. As shown in FIG. 10, a vapor curve for commercial gasoline at atmospheric conditions (1 bar) normally ranges from an initial boiling point around (IBP) 20° C. to a final boiling point (FBP) around 200° C. The temperature at which 50% of the fuel is vaporized (T50) typically falls in the 80° C. to 120° C. range. This vapor curve shifts to lower temperatures at sub-atmospheric conditions (such as in the intake manifold of an operating engine), and to higher temperatures at elevated pressures (such as the fuel pressure in the fuel system and fuel injector).

Figure 11:
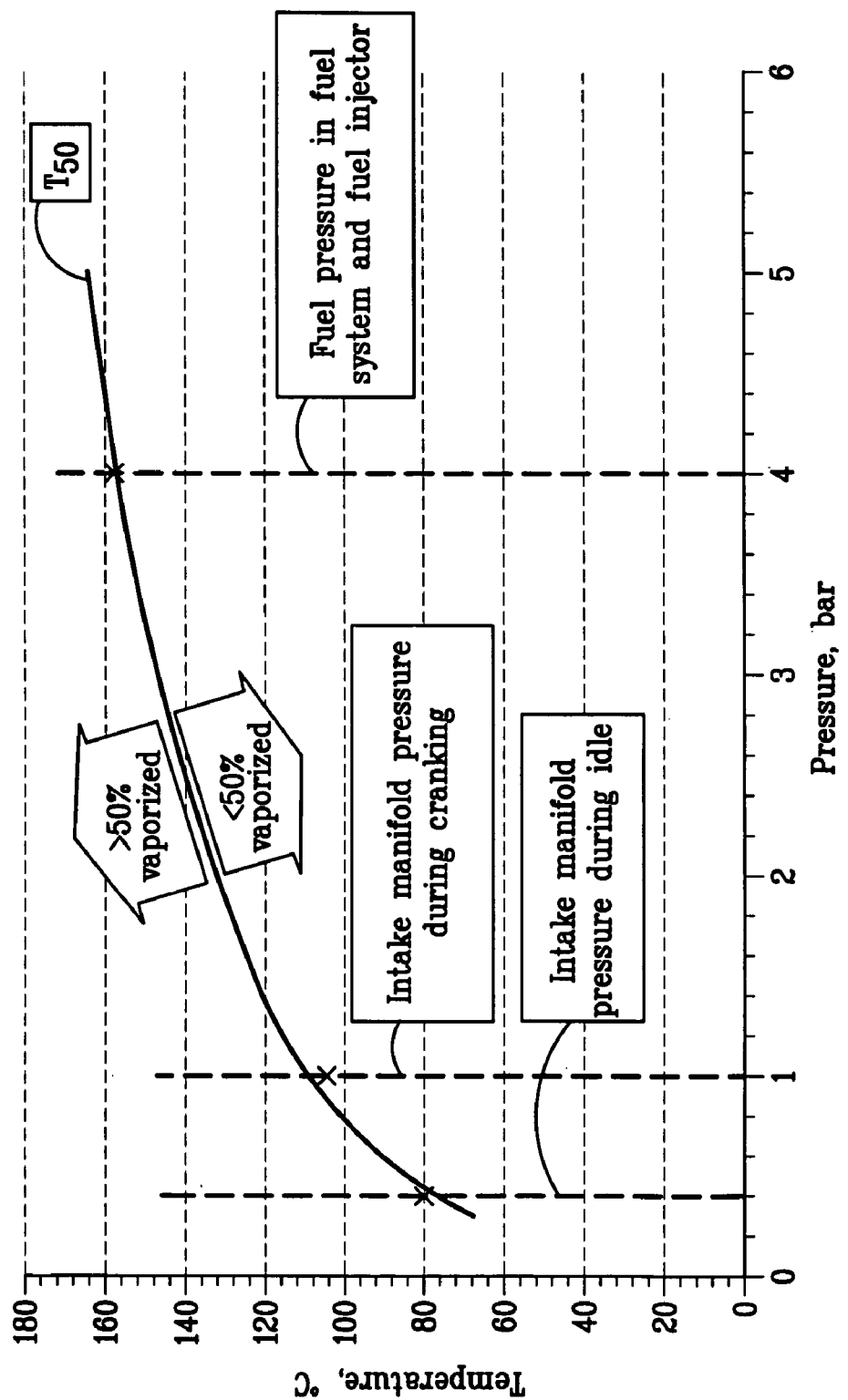
FIG. 11 shows temperature for 50% vaporization for typical commercial gasoline at different pressures.

For a typical commercial gasoline, the temperature at which 50% is vaporized is close to 160° C. in the fuel injector, but may be as low as 80° C. in the intake manifold during idling, see FIG. 11. Referring to FIG. 10, if the fuel in the fuel injector is maintained at 100° C., only a very small fraction (<5%) will be vaporized. As this fuel leaves the injector nozzle and enters the intake manifold at idling conditions (0.4 bar), most of the liquid fuel will flash vaporize since the ambient pressure is now lower than the 75% vapor pressure.

Figure 12:
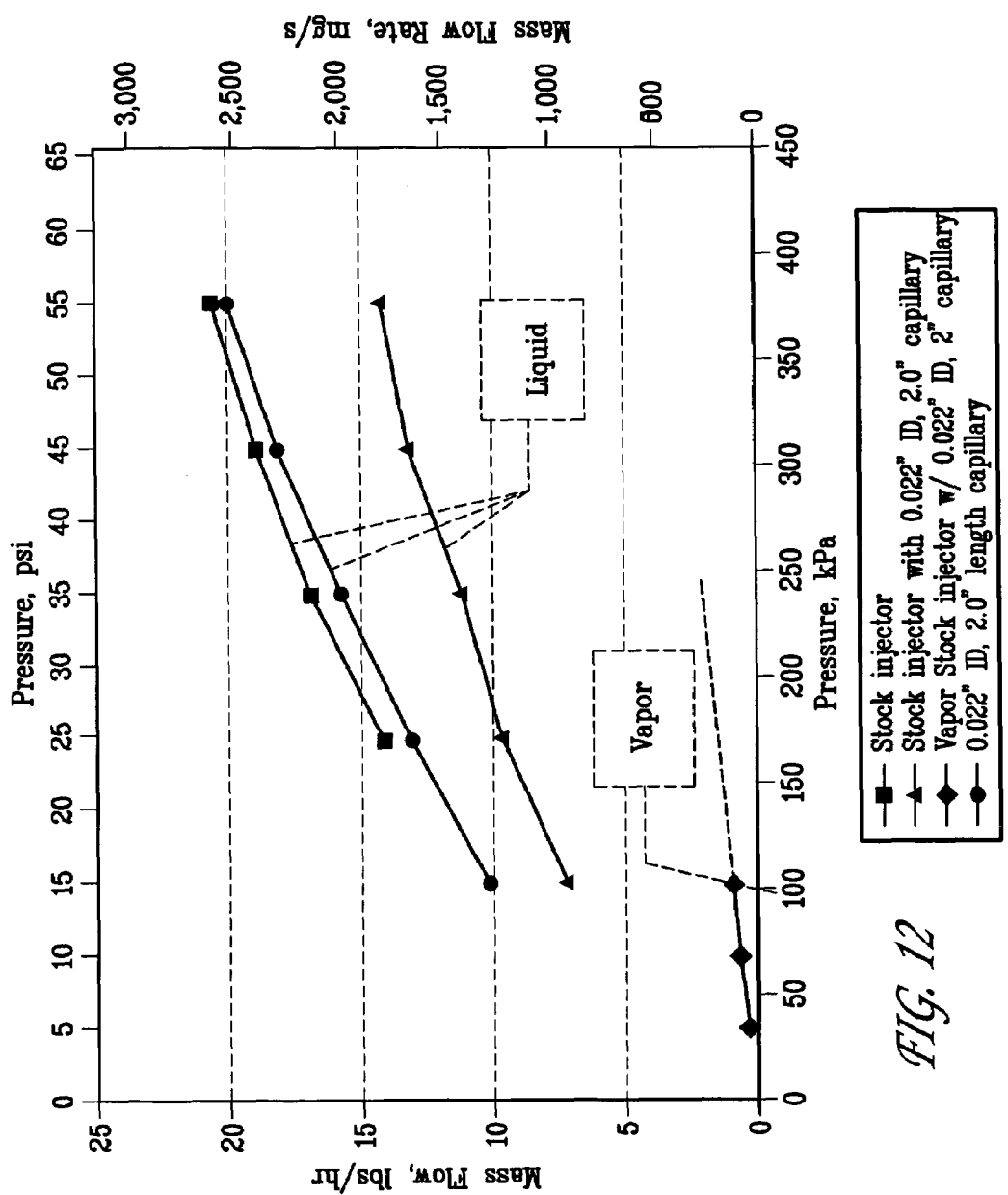
FIG. 12 shows mass flow rates of liquid and vaporized fuel for a conventional port fuel injector at 100% duty cycle.

In a conventional liquid port fuel injector operating at typical fuel pressures of about 40 psig, the 100% duty-cycle mass flow rates for vaporized gasoline is 15% of the corresponding liquid fuel flow rate as shown in FIG. 12. For a given injector geometry (i.e., fixed open area), this discrepancy is a result of differences in density between the liquid and vapor phases. As a result, the mass flow rate with vaporized gasoline is too low for high load operation. At higher duty cycles however, the mass flow rate capacity with vaporized fuel is sufficient for engine start-up and idle.

Figure 13:
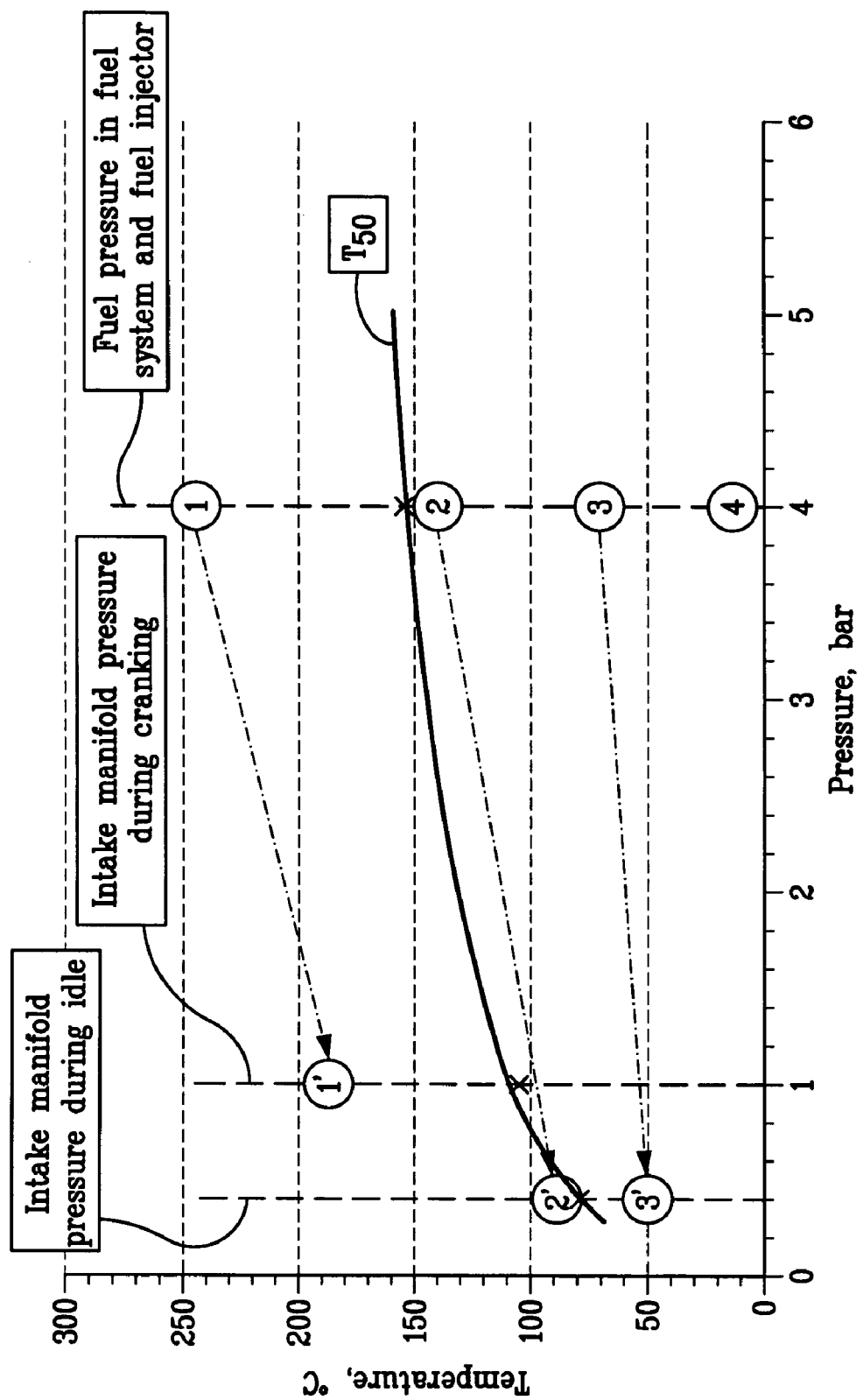
FIG. 13 shows different modes of operation for the in-line-heater fuel injector design, in accordance with a preferred form.

The different modes of operation are represented in FIG. 13. During cranking, the intake manifold pressure is atmospheric and thus the fuel pressure in the fuel injector is only four times higher than the intake manifold pressure. Consistent with a preferred form, the fuel temperature is deliberately controlled to levels well above the FBP at 4 bar. This is done to quickly heat up the injector nozzle and to ensure that the engine is supplied with high quality vaporized fuel for start-up. As the fuel exits the injector nozzle (see 1 to 1' of FIG. 13) it remains a super-heated vapor. Using high injector duty cycles, the mass flow rate during this mode of operation is sufficient to start and idle the engine.

Still referring to FIG. 13, during cold-start idle, the intake manifold pressure is sub-atmospheric (0.4 bar) and thus the fuel pressure in the fuel injector is about ten times higher than the intake manifold pressure. In accordance with a preferred form, the fuel temperature is lowered so that most of the fuel in the injector remains liquid. As the fuel exits the injector nozzle into the sub-atmospheric conditions in the intake manifold, most of the fuel flash vaporizes. Since most of the fuel in the injector is liquid, much shorter injector duty cycles can be used to provide the required fuel mass flow rates, with significant mass flow margins available for increased engine load at vehicle launch.

Following cold-start and initial engine warm-up, the fuel temperature is further reduced below the IBP at 4 bar pressure. Consequently, all fuel in the injector is in liquid phase and the fuel mass flow capacity of the injector can support the entire engine operating range, up to full load. A fraction (up to 50% at idle) of the fuel will still flash vaporize as it enters the intake manifold. As may be appreciated by those skilled in the art, the slightly elevated temperature in the capillary flow passage is also beneficial for inhibiting deposit build up since some fuel additives designed to keep engine components deposit free are temperature sensitive and do not function at low temperatures.

For normal operation finally, the capillary is left unheated and the fuel injector functions like a conventional port fuel injector.

Consistent with industry practice, the controller may be programmed to provide a limp-home capability in case of system malfunction. As envisioned, the limp-home capability would terminate the heating of the capillary flow passage, permitting delivery of liquid fuel to the engine. In limp-home mode, it may also be desirable to operate the engine in a fuel-rich condition, potentially enabling smoother operation during a critical time.

EXAMPLES

Example 1

Tests were performed wherein JP 8 jet fuel was vaporized by supplying the fuel to a heated capillary flow passage at constant pressure with a micro-diaphragm pump system. In these tests, capillary tubes of different diameters and lengths were used. The tubes were constructed of 304 stainless steel having lengths of 1 to 3 inches and internal diameters (ID) and outer diameters (OD), in inches, as follows: 0.010 ID/0.018 OD, 0.013 ID/0.033 OD, and 0.017 ID/0.025 OD. Heat for vaporizing the liquid fuel was generated by passing electrical current through a portion of the metal tube. The droplet size distribution was measured using a Spray-Tech laser diffraction system manufactured by Malvern. Droplets having a Sauter Mean Diameter (SMD) of between 1.7 and 4.0 μm were produced. SMD is the diameter of a droplet whose surface-to-volume ratio is equal to that of the entire spray and relates to the spray's mass transfer characteristics.

Example 2

Tests were performed again using gasoline which was vaporized by supplying the fuel to a heated capillary flow passage at constant pressure with a micro-diaphragm pump system. In these tests, capillary flow passages of different diameters and lengths were used. The following table shows empirical findings for various capillary tube configurations.

| Internal Diameter in. | Heated Length in. | Fuel Pressure psig. | Results |
| --- | --- | --- | --- |
| 0.027 | 6.75 | 75 | Generated fully vaporized flow and flow rate of 180 mg/s |
| 0.029 | 7.25 | 65 | Generated high flow rates with a heating voltage of 20 V. |
| 0.020 | 6.0 | 70 | Generated at least 200 mg/s flow rate with substantially adequate vapor characteristics. |

Example 3

In tests using a Ford 4.6 liter V8 engine, one bank of four cylinders was modified to include fuel delivery devices of the invention as shown in FIG. 1. The capillary heating elements were mounted with the tip of the capillary positioned flush with the intake port wall, this being the location of the stock fuel injection nozzle. The tests were carried out with continuous injection (100% duty cycle) and, therefore, fuel pressure was used to regulate the fuel vapor flow rate.

Figure 14:
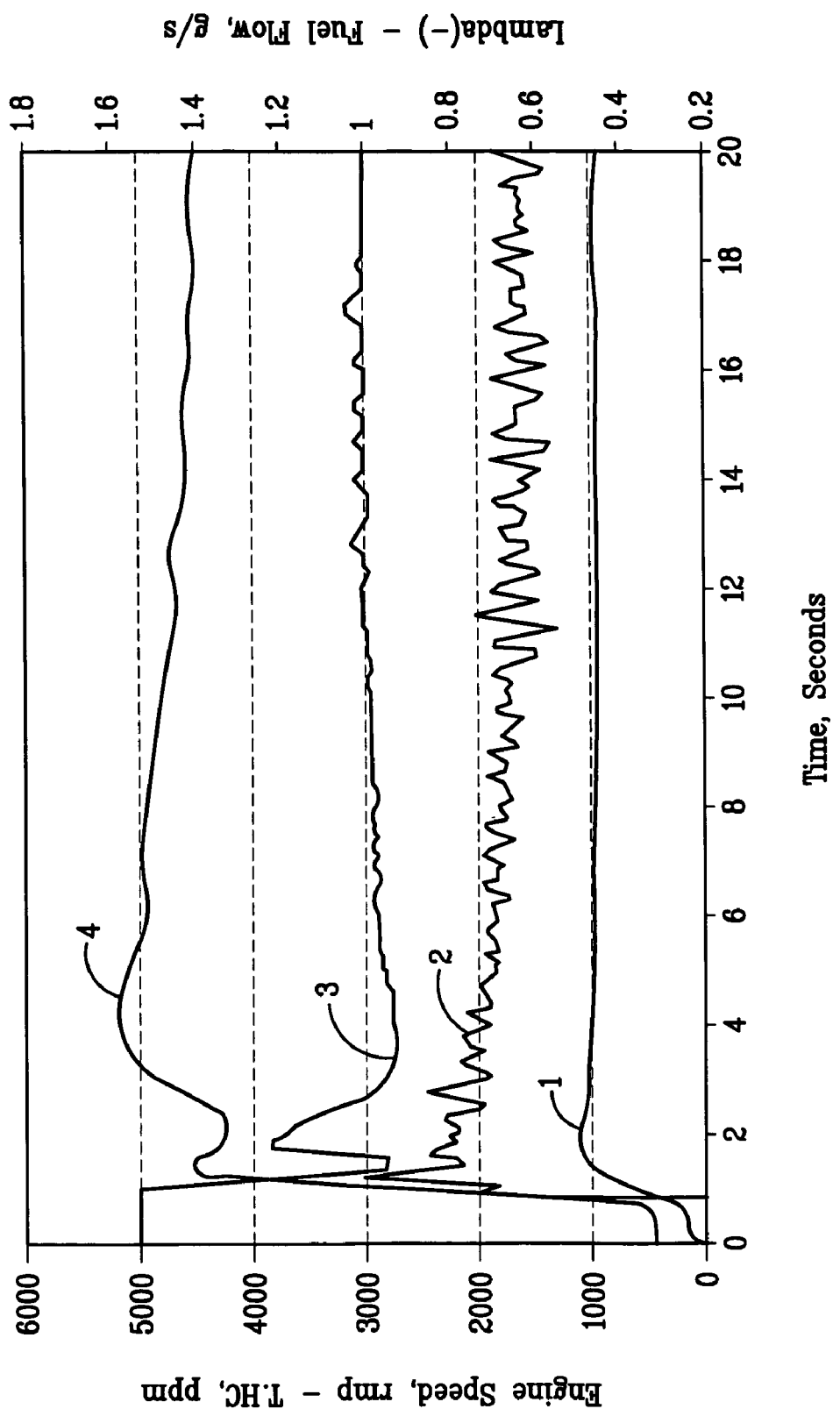
FIG. 14 is a chart illustrating engine parameters during the first 20 seconds of starting in engine using the fuel delivery device of the invention.

Referring to FIG. 14, a graph illustrating results of the capillary fuel delivery device during the first 20 seconds of cold start of an engine is presented. Plot line 1 represents the engine speed, in revolutions per minute, as time progresses along the x-axis. Plot line 2 represents the fuel flow, in grams per second, as time progresses along the x-axis. Plot line 3 represents lambda as time progresses along the x-axis, wherein a lambda of unity represents the stoichiometric ratio of air to fuel. Plot line 4 represents the total hydrocarbon emissions output, in methane equivalent parts per million, from the exhaust of the engine as time progresses along the x-axis.

Figure 15:
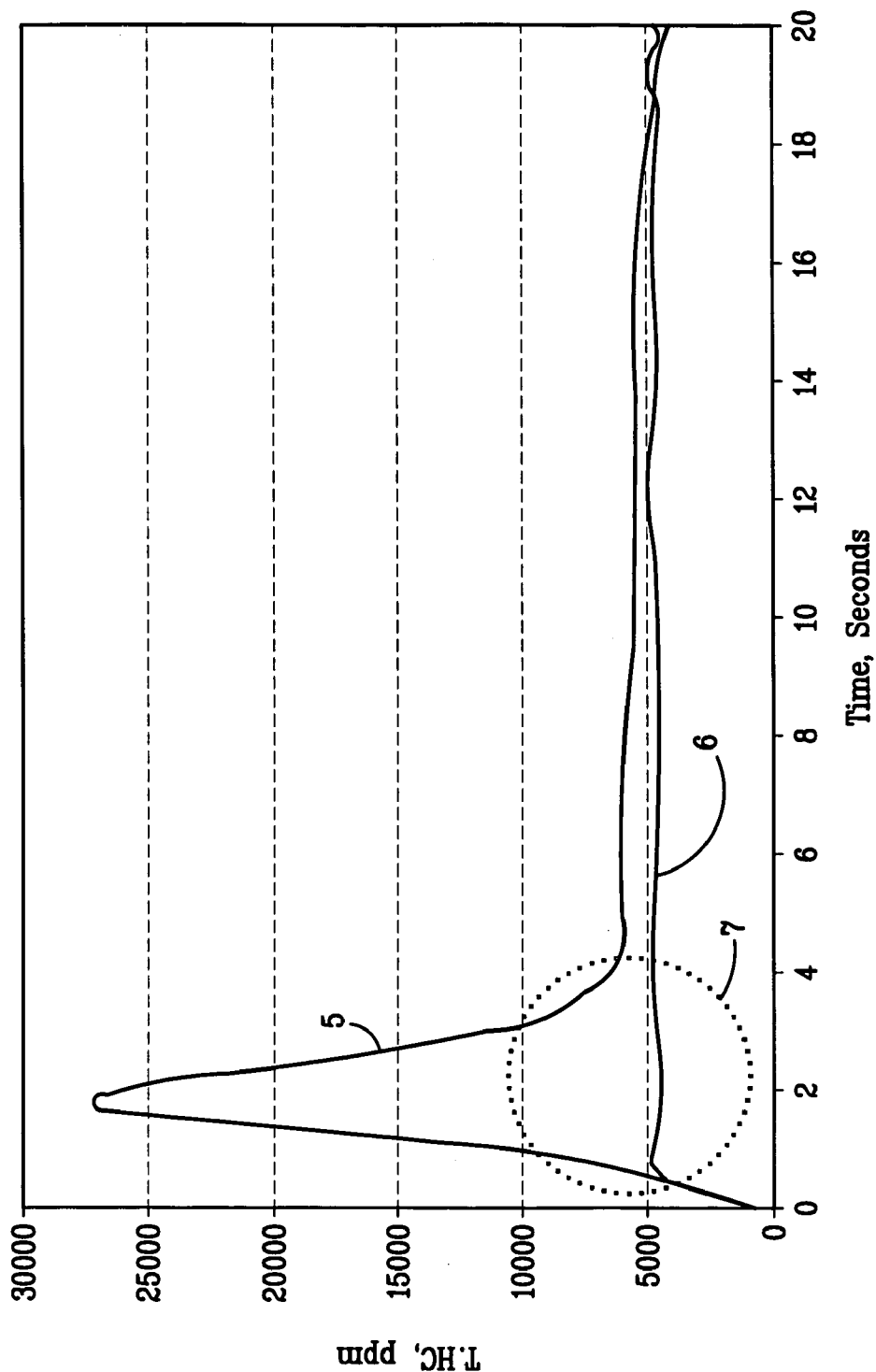
FIG. 15 is a chart illustrating a comparison of engine emissions from the fuel delivery device of the invention with conventional port-fuel injectors.

As illustrated by plot line 3 in FIG. 14, the initial over-fueling required for the stock engine hardware and control strategy was eliminated through the use of the fuel delivery device of the invention. That is, the fuel delivery device of the invention efficiently vaporized liquid fuel during the initial start-up period such that the engine was started with a near-stoichiometric fuel/air ratio. FIG. 15 is a graph which illustrates the emission reduction resulting from the near-stoichiometric start achieved with the fuel delivery device of the invention (plot line 6) compared to the conventional over-fueling start-up strategy (plot line 5). Specifically, the results in FIG. 15 demonstrate that the fuel delivery device of the invention reduced integrated hydrocarbon emissions by 46% during the first ten seconds of cold-start as compared to the stock configuration, which requires over-fueling. The area indicated by circle 7 illustrates the dramatic reduction of hydrocarbon emissions during the first four seconds of starting the engine.

While the subject invention has been illustrated and described in detail in the drawings and foregoing description, the disclosed embodiments are illustrative and not restrictive in character. All changes and modifications that come within the scope of the invention are desired to be protected. As an example, a plurality of capillary passages can be provided, with the fuel being passed through the passages in parallel when a higher volume flow rate is desired.

What is claimed is:

1. A method for controlling a fuel system and delivering fuel to an internal combustion engine, the fuel system including at least one fuel injector having at least one capillary flow passage, a heat source arranged along the at least one capillary flow passage, the heat source capable of heating the liquid fuel in the at least one capillary flow passage to a level sufficient to convert at least a portion thereof from the liquid state to a vapor state, the method comprising the steps of:

(a) determining engine air flow;
(b) measuring a value indicative of degree of engine warm-up;
(c) determining a portion of liquid fuel to be converted to the vapor state by the at least one capillary flow passage, said determining step employing the values measured in steps (a)-(b);
(d) controlling power supplied to the heat source of the at least one fuel injector to achieve a predetermined target temperature, the predetermined target temperature operable to convert the portion of liquid fuel to the vapor state determined in step (c), said step of controlling power employing a binary power source; and
(e) delivering the fuel to a combustion chamber of the internal combustion engine;
wherein the portion of liquid fuel to be converted to the vapor state is determined to achieve minimal exhaust emissions.

2. The method of claim 1, wherein said step of determining engine air flow further comprises (i) measuring engine speed and (ii) measuring intake manifold pressure of the internal combustion engine.

3. The method of claim 1, wherein said step of controlling power supplied to the heat source of the at least one fuel injector includes the step of setting a resistance value, the resistance value relatable to the predetermined target temperature.

4. The method of claim 3, wherein during engine cranking, the power supplied to the heat source of the at least one fuel injector is controlled to a resistance value sufficient to achieve a predetermined target temperature equal to or greater than a final boiling point of the fuel at a pressure about equal to fuel system supply pressure.

5. The method of claim 3, wherein during a cold-start idle condition of the internal combustion engine, the power supplied to the heat source of the at least one fuel injector is controlled to a resistance value sufficient to achieve a predetermined target temperature that is below a final boiling point of the fuel and sufficient to achieve flash vaporization of the fuel as it exits the orifice of the injector.

6. The method of claim 3, wherein during engine warm-up and prior to achieving a fully warmed condition, the power supplied to the heat source of the at least one fuel injector is controlled to a resistance value sufficient to achieve a predetermined target temperature that is below an initial boiling point of the fuel when the fuel is at a pressure about equal to fuel system supply pressure.

7. The method of claim 1, wherein the delivery of vaporized fuel to the combustion chamber of the internal combustion engine is limited to a start-up and warm-up period of operation of the internal combustion engine.

8. The method of claim 7, further comprising delivering liquid fuel to the combustion chamber of the internal combustion engine when the internal combustion engine is at a fully warmed condition.

9. The method of claim 1, wherein the value indicative of degree of engine warm-up measured in step (b) is selected from the group consisting of engine coolant temperature, engine lubricant temperature, ambient air temperature and time elapsed from engine start-up.

10. The method of claim 1, wherein a stream of vaporized fuel is delivered to each combustion chamber of the internal combustion engine.

11. The method of claim 1, wherein a stream of vaporized fuel is delivered to the intake manifold for distribution to each combustion chamber of the internal combustion engine.

12. The method of claim 1, further comprising cleaning periodically the at least one capillary flow passage.

13. The method of claim 12, wherein said periodic cleaning comprises (i) halting the heating of the at least one capillary flow passage, (ii) supplying a solvent to the at least one capillary flow passage, whereby deposits formed in the at least one capillary flow passage are substantially removed.

14. The method of claim 13, wherein the solvent includes liquid fuel.

15. The method of claim 2, wherein the step of delivering fuel to a combustion chamber of the internal combustion engine further comprises determining an amount of fuel required based on the engine speed and manifold pressure measured in steps (i) and (ii) and controlling the amount of fuel delivered using the valve for metering fuel of the at least one fuel injector.

16. The method of claim 1, wherein the stream of fuel mixes with air and forms an aerosol in the combustion chamber prior to combustion, the method including forming the aerosol with a particle size distribution, a major portion of which is 25 µm or less prior to igniting the vaporized fuel to initiate combustion.

17. The method of claim 1, wherein the at least one fuel injector includes a valve for metering fuel to the internal combustion engine, the valve located proximate to an outlet end of the at least one capillary flow passage.

18. A fuel system for use in an internal combustion engine, comprising:

(a) a plurality of fuel injectors, each injector including (i) at least one capillary flow passage said at least one capillary flow passage having an inlet end and an outlet end; (ii) a heat source arranged along the at least one capillary flow passage, said heat source operable to heat the liquid fuel in said at least one capillary flow passage to a level sufficient to convert at least a portion thereof from the liquid state to a vapor state, and (iii) a valve for metering fuel to the internal combustion engine, the valve located proximate to said outlet end of said at least one capillary flow passage;
(b) a liquid fuel supply system in fluid communication with said plurality of fuel injectors;
(c) a controller to control the power supplied to said heat source of each of said plurality of fuel injectors to achieve a predetermined target temperature, the predetermined target temperature operable to convert the portion of liquid fuel to the vapor state;
(d) means for determining engine air flow, said means operatively connected to said controller; and
(e) a sensor for measuring a value indicative of degree of engine warm-up, said sensor operatively connected to said controller;
wherein the portion of liquid fuel to be converted to the vapor state is controlled to achieve minimal exhaust emissions;
wherein said controller is a binary power source.

19. The fuel system of claim 18, wherein said means for determining engine air flow comprises a sensor for measuring engine speed, said sensor operatively connected to said controller, and a sensor for measuring intake manifold pressure, said sensor operatively connected to said controller.

20. The fuel system of claim 18, wherein power supplied to said heat source of each of said fuel injectors is controlled by setting a resistance value, the resistance value relatable to the predetermined target temperature.

21. The fuel system of claim 18, wherein during cranking of the internal combustion engine, the power supplied to said heat source of each of said fuel injectors is controlled to a resistance value sufficient to achieve a predetermined target temperature equal to or greater than a final boiling point of the fuel at a pressure of about four times atmospheric pressure.

22. The fuel system of claim 18, wherein during a cold-start idle condition of the internal combustion engine, the power supplied to the heat source of each of said fuel injectors is controlled to a resistance value sufficient to achieve a predetermined target temperature that is below a final boiling point of the fuel and sufficient to achieve flash vaporization of the fuel as it exits the orifice of the injector.

23. The fuel system of claim 18, wherein during warm-up of the internal combustion engine and prior to achieving a fully warmed condition, the power supplied to said heat source of each of said fuel injectors is controlled to a resistance value sufficient to achieve a predetermined target temperature that is below an initial boiling point of the fuel when the fuel is at a pressure about equal to fuel system supply pressure.

24. The fuel system of claim 23, wherein delivery of vaporized fuel to the internal combustion engine is limited to a start-up and warm-up period of operation of the internal combustion engine.

25. The fuel system of claim 18, wherein delivery of vaporized fuel to the internal combustion engine is limited to a start-up and warm-up period of operation of the internal combustion engine.

26. The fuel system of claim 18, wherein said sensor for measuring the degree of engine warm-up is selected from the group consisting of an engine coolant temperature sensor, an engine lubricant temperature sensor, an ambient air temperature sensor and a timer for measuring time elapsed from engine start-up.

27. The fuel system of claim 18, wherein said controller to control the power supplied to said heat source of each fuel injector also determines an amount of fuel required based on the sensed conditions of engine speed and manifold pressure and controls the amount of fuel delivered using said valve for metering fuel of each fuel injector.

28. The fuel system of claim 18, further comprising means for cleaning deposits formed during operation of the apparatus.

29. The fuel system of claim 28, wherein said means for cleaning deposits includes means for placing said at least one capillary flow passage in fluid communication with a solvent so as to enable in-situ cleaning of said capillary flow passage when the solvent is introduced into said at least one capillary flow passage.

30. The fuel system of claim 29, wherein the solvent comprises liquid fuel from the liquid fuel source and wherein the heat source is deactivated during cleaning of said capillary flow passage.

31. The fuel system of claim 18, wherein said metering valves are solenoid operated.

32. The fuel system of claim 18, wherein said at least one capillary flow passage is integrated with a liquid fuel injector.

33. The fuel system of claim 32, wherein said controller is operable to control fuel delivery to said liquid fuel injector and said at least one capillary flow passage of each fuel injector.

34. The fuel system of claim 33, wherein said liquid fuel injector further comprises a fuel injector nozzle proximate to said outlet end of said at least one capillary flow passage.

35. The fuel system of claim 18, wherein said controller is operable to terminate heating said at least one capillary flow passage by said heat source and deliver atomized fuel through said fuel injector nozzle during normal operating temperatures, said fuel injector nozzle in communication with a combustion chamber of the internal combustion engine.

36. The fuel system of claim 35, wherein said controller provides a limp-home capability in a case of system malfunction.

37. The fuel system of claim 18, wherein said controller provides a limp-home capability in a case of system malfunction.

38. The fuel system of claim 37, wherein said limp-home capability terminates heating said at least one capillary low passage, permitting fuel-rich delivery of liquid fuel to the internal combustion engine.

39. The fuel system of claim 36, wherein said limp-home capability terminates heating said at least one capillary low passage, permitting fuel-rich delivery of liquid fuel to the internal combustion engine.

* * * * *